United States Patent
Lichoulas et al.

(10) Patent No.: US 9,380,357 B2
(45) Date of Patent: Jun. 28, 2016

(54) UNIVERSAL NETWORK INTERFACE DEVICE BASE MODULE

(75) Inventors: Ted Lichoulas, Simpsonville, SC (US); Eddie Kimbrell, Dacula, GA (US); Ray Mouhot, Granbury, TX (US)

(73) Assignee: AFL Telecommunications LLC, Duncan, SC (US)

( * ) Notice: Subject to any disclaimer, the term of this patent is extended or adjusted under 35 U.S.C. 154(b) by 91 days.

(21) Appl. No.: 13/643,204

(22) PCT Filed: Oct. 28, 2011

(86) PCT No.: PCT/US2011/058310
§ 371 (c)(1),
(2), (4) Date: Oct. 24, 2012

(87) PCT Pub. No.: WO2012/058554
PCT Pub. Date: May 3, 2012

(65) Prior Publication Data
US 2013/0039017 A1 Feb. 14, 2013

Related U.S. Application Data

(60) Provisional application No. 61/407,578, filed on Oct. 28, 2010, provisional application No. 61/411,489, filed on Nov. 9, 2010, provisional application No. 61/542,578, filed on Oct. 3, 2011, provisional application No. 61/543,408, filed on Oct. 5, 2011.

(51) Int. Cl.
*H04M 1/00* (2006.01)
*H04Q 1/02* (2006.01)

(52) U.S. Cl.
CPC .................................... *H04Q 1/028* (2013.01)

(58) Field of Classification Search
CPC ... H04Q 1/028; H04Q 1/02; H04Q 2201/802; H05K 7/00; H05K 9/00; H04M 19/06
USPC ............................... 174/50–64; 361/724–730
See application file for complete search history.

(56) References Cited

U.S. PATENT DOCUMENTS

| | | | | | |
|---|---|---|---|---|---|
| 4,203,066 | A | * | 5/1980 | Buck | 324/538 |
| 4,850,014 | A | * | 7/1989 | Gillis | H04Q 1/028 361/657 |
| D314,759 | S | * | 2/1991 | Collins | D13/152 |
| 5,062,148 | A | * | 10/1991 | Edwards | 455/506 |
| 5,363,440 | A | * | 11/1994 | Daoud | H04Q 1/028 379/412 |
| 5,413,494 | A | * | 5/1995 | Dewey et al. | 439/188 |
| 5,416,668 | A | * | 5/1995 | Benzoni | 361/816 |
| 5,566,040 | A | * | 10/1996 | Cosquer et al. | 361/113 |
| 5,566,055 | A | * | 10/1996 | Salvi, Jr. | 361/816 |
| 5,822,195 | A | * | 10/1998 | Brench et al. | 361/818 |
| 5,936,198 | A | * | 8/1999 | Rentmore | 174/51 |

(Continued)

OTHER PUBLICATIONS

International Search Report for PCT/US2011/058310 dated Mar. 16, 2012.

*Primary Examiner* — Hao C Nguyen
*Assistant Examiner* — Xanthia C Cunningham
(74) *Attorney, Agent, or Firm* — Dority & Manning, P.A.

(57) ABSTRACT

An universal network interface device base module including an access module, a modem module electrically connected to the access module, a dividing structure placed between the access module and modem module, and a base plate, wherein the access module, modem module and dividing structure are mounted on the base plate.

26 Claims, 31 Drawing Sheets

(56) References Cited

U.S. PATENT DOCUMENTS

| | | | | |
|---|---|---|---|---|
| 5,978,472 A * | 11/1999 | Tuvy | .................. | H04M 1/0291 379/329 |
| 6,028,769 A * | 2/2000 | Zurek | .................... | H04N 7/102 174/50.51 |
| 6,127,627 A * | 10/2000 | Daoud | ............................ | 174/50 |
| 6,157,714 A * | 12/2000 | Daoud | ................ | B65D 43/161 220/4.02 |
| 6,191,356 B1 * | 2/2001 | Daoud | ................... | H02G 3/088 174/50 |
| 6,229,890 B1 * | 5/2001 | Kerr | .................... | H04M 1/0293 379/413 |
| 6,282,285 B1 * | 8/2001 | Daoud | ................ | H04M 1/0293 379/399.01 |
| 6,414,241 B1 * | 7/2002 | O'Donnell | ............. | H02G 3/086 174/50 |
| D463,775 S * | 10/2002 | Byrne | ....................... | D13/139.4 |
| 6,683,950 B1 * | 1/2004 | Harwood et al. | ........ | 379/413.02 |
| 6,760,531 B1 * | 7/2004 | Solheid | ................ | G02B 6/4452 385/135 |
| 6,795,552 B1 * | 9/2004 | Stanush et al. | ........... | 379/413.01 |
| 6,903,910 B1 | 6/2005 | Griesing et al. | | |
| 7,062,042 B1 * | 6/2006 | Gilbert | .................... | H04Q 1/14 379/413.02 |
| 7,333,708 B2 * | 2/2008 | Blackwell, Jr. | ...... | G02B 6/4451 385/134 |
| 7,493,003 B2 * | 2/2009 | Kowalczyk | .......... | G02B 6/4452 385/135 |
| 7,734,040 B1 * | 6/2010 | Ayres, III | ................ | H04M 19/06 379/441 |
| D626,069 S * | 10/2010 | Byrne | ....................... | D13/139.4 |
| 8,153,910 B1 * | 4/2012 | Penczak | ................. | H02G 3/185 174/486 |
| 8,519,276 B2 * | 8/2013 | Isaacks | .................. | H02G 3/185 165/287 |
| 8,547,699 B1 * | 10/2013 | McCleary | .......... | H05K 7/20445 165/104.33 |
| 9,059,576 B2 * | 6/2015 | Isaacks | .................. | H02G 3/00 |
| 2002/0039286 A1 * | 4/2002 | Frank et al. | .................... | 361/818 |
| 2003/0002660 A1 * | 1/2003 | Albanese et al. | ........ | 379/413.02 |
| 2003/0078015 A1 * | 4/2003 | Laetsch | .............. | H05K 7/20445 455/90.3 |
| 2006/0067522 A1 * | 3/2006 | Paulsen | ................... | 379/413.02 |
| 2006/0126647 A1 | 6/2006 | Hicks, III | | |
| 2006/0153516 A1 * | 7/2006 | Napiorkowski | ....... | G02B 6/445 385/135 |
| 2007/0047894 A1 * | 3/2007 | Holmberg | ............. | G02B 6/4455 385/135 |
| 2007/0160195 A1 * | 7/2007 | Vo et al. | .................... | 379/413.04 |
| 2007/0230112 A1 * | 10/2007 | Chen | ................. | H05K 7/20581 361/679.4 |
| 2008/0131132 A1 * | 6/2008 | Solheid | ................ | G02B 6/4452 398/117 |
| 2008/0151874 A1 | 6/2008 | Wynn | | |

\* cited by examiner

UNIVERSAL NETWORK INTERFACE DEVICE BASE MODULE

CROSS-REFERENCE TO RELATED APPLICATIONS

This application is a U.S. National Stage application of PCT/US2011/058310, filed Oct. 28, 2011, which claims priority to U.S. Provisional Patent Application Nos. 61/542,578 filed Oct. 3, 2011, 61/411,489 filed Nov. 9, 2010, and 61/407,578 filed Oct. 28, 2010, the disclosures of which are incorporated by reference herein in their entireties.

BACKGROUND

1. Field

The invention is related to a universal network interface device base module which can easily installed.

2. Related Art

AT&T's u-Verse and Verizon's FiOS installations require significant work by installation crews to reconfigure the home wiring in order to provide service. One installation crew will need to connect a drop to the customer residence, and install an optical network terminal (ONT) for fiber-based services or install filters in a network interface device (NID) for very high bit rate digital subscriber line (VDSL)-based services. A second installation crew will then need to work inside the customer residence establishing a high data rate pathway to the modem/gateway and reconfigure existing home cabling to provision service from the modem/gateway to the point-of-use. Although this methodology ultimately provide high quality service to the customer, it is labor-intensive and expensive for the service provider.

Additionally, this technical approach is service provider dependent. If a customer makes the decision to switch service, the home cabling will need to be configured from a new home network topology. This "rewiring" is even more time consuming and even more expensive for the service provider.

Therefore, there is a need for an universal modular modem gateway that may meet some of the following objectives: 1. Provide a common base platform for installer; 2. provide a common form factor for the access module (primary service provider/customer premise interface/media conversion); 3. provide a common form factor for the modem module; 4. provide a centralized point from which to distribute signals into the customer residence; and 5. provide a clear/simple methodology for technology/platform upgrades.

Wireless telephony demand continues to increase in the United States and abroad. With the introduction new higher bandwidth wireless protocols, such as, 3G and 4G, and corresponding introduction of feature rich smart phones, wireless service providers are under continual market pressure to increase wireless coverage and bandwidth.

The current method to increase wireless coverage is to add new cell towers and the corresponding backbone to support the increased wireless demand. Although this approach replicates the existing wireless infrastructure, this approach is capital intensive and slow to implement.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of a universal network interface device base module includes a universal network interface device base module with an access module; a modem module electrically connected to the access module; a dividing structure placed between the access module and the modem module; and a base plate; wherein the access module, modem module and dividing structure are mounted on the base plate.

The embodiment of a universal network interface device base module may include a cable connecting said access module to said modem module.

The embodiment of a universal network interface device base module may include a dividing structure with an opening through which the cable passes.

The embodiment of a universal network interface device base module may include a dividing structure with a first detent on a first surface facing the access module and a second detent on a surface facing the modem module; the access module having a first recess on a surface facing the first surface of the dividing structure, such that the first detent fits into the access module first recess when the access module is mounted on the base plate; and the modem module has a first recess on a surface facing the second surface of the dividing structure, such that the second detent fits into the modem module first recess when the modem module is mounted on the base plate.

The embodiment of a universal network interface device base module may include a base plate with a plurality of flanges that abut surfaces of the access module and modem module.

The embodiment of a universal network interface device base module may include a base plate with at least one hinge assembly that can be used to mount the network interface device in an enclosure.

The embodiment of a universal network interface device base module may include an access module that is a one-line xDSL module.

The embodiment of a universal network interface device base module may include an access module that is a two-line xDSL module.

The embodiment of a universal network interface device base module may include an access module that is a GPON module.

The embodiment of a universal network interface device base module may include a modem module that is a wireless modem module.

The embodiment of a universal network interface device base module may include a dividing structure that has a T-shape.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings. If the components are the same in different drawings, the same item numbers are used to the extent possible for ease of reference.

Figure 1:
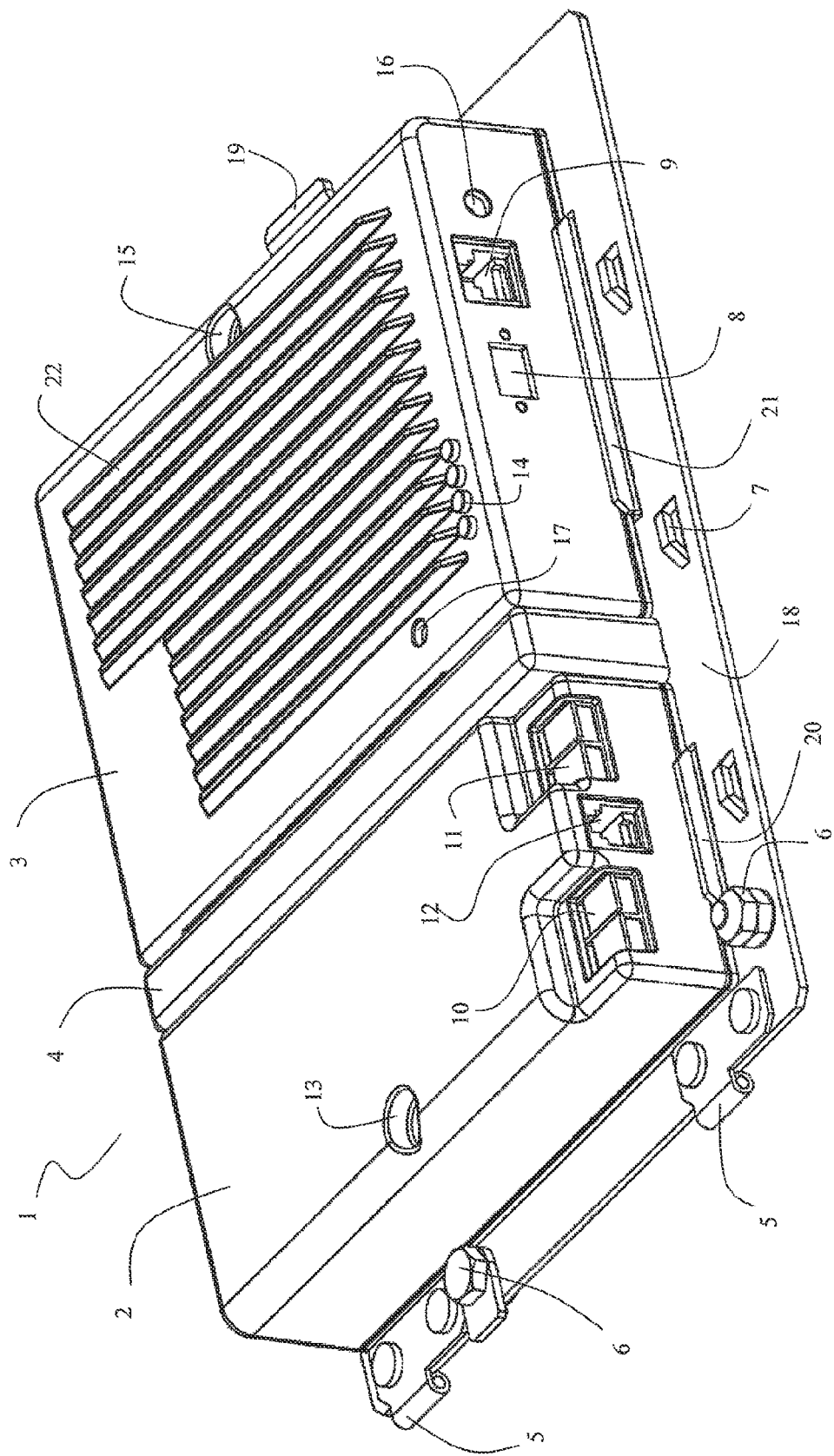
FIG. 1 shows an isometric view of an embodiment of a uNID base module.
Figure 2:
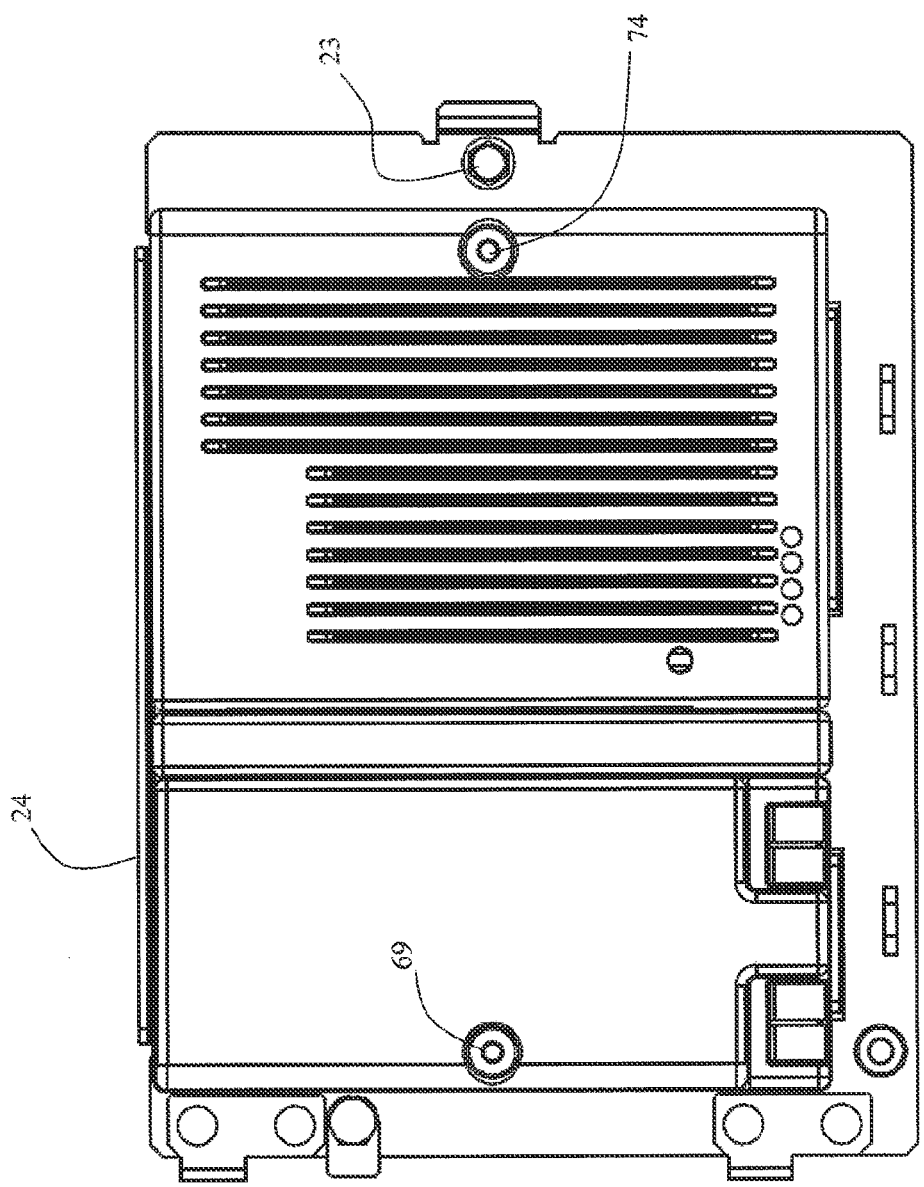
FIG. 2 shows a plan view of an embodiment of a uNID base module.
Figure 3:
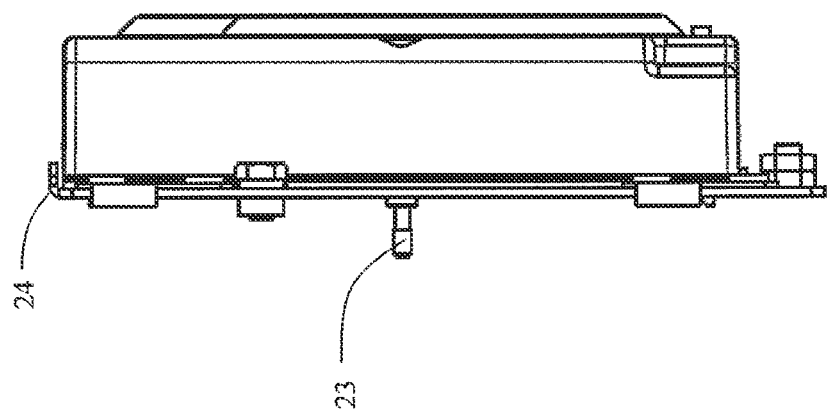
FIG. 3 shows a side view of an embodiment of a uNID base module.

FIG. 1 shows an isometric view of an embodiment of a universal NID (uNID) base module 1. FIG. 2 shows a plan view of an embodiment of a uNID base module. FIG. 3 shows a side view of an embodiment of a uNID base module. The uNID based module 1 includes three sub-components: a uNID access module 2; a uNID modem module 3; and a uNID base plate 18, which includes a dividing structure 4. The uNID access module 2 and uNID modem module 3 and dividing structure 4 can be field attached and removed from the uNID base plate 18. There are several uNID access module variants, including, but not limited to: a one-line xDSL (whenever xDSL is referred to in the specification, it could include any one of ADSL, VDSL, VDSL2, or other type of DSL) access module; a two-line xDSL access module; and a GPON access module. FIG. 1 shows the xDSL variant of access module. There are several uNID modem module variants, including, but not limited to: a one-line xDSL modem module; a two-line xDSL modem module; and a GPON modem module.

A threaded ground stud 6 is mounted to the uNID base plate 18. The uNID access module 2 printed circuit board 119 (PCB) (all variants) and uNID modem module 3 PCB 120 are grounded to the uNID base plate 18 when attached/installed. The uNID base module 1 is designed to be installed in a customer premise on an inside wall (controlled environment) or on a mounting bracket in a NID that is installed either in a customer premise interior (controlled environment) or customer premise exterior (outside plant environment).

The access module 2 can have several inputs, such as two IDC connectors 10, 11 (one which is connected to a premise and one which is connected to a telephone company), an RJ-31 input 12 (which can be used for an alarm). Alternatively, an RJ-45 may be used in place of an RJ-31 to install residential alarms. The access module 2 has a mounting hole 13, through which a screw 69 can be inserted to attach the access module 2 to the uNID base plate 18.

The modem module 3 can have an input, such as a RJ-45 input (which is connected to a premise) 9. It may also have modem status lights 14 and a power connection (if power-over-Ethernet is not available) 16. The modem module 3 can also have a cutout 8 for an SC connector for a GPON modem. The modem module 3 can also have a power jack 16, such as for 12 vDC. The modem module 3 can have fins 22, which help cool the modem module 3. The modem module 3 has a mounting hole 15, through which a screw 74 can be inserted to attach the modem module 3 to the uNID base plate 18. The modem module 3 has an access hole 17 for a tool to be used to disengage the retention clip on the mating plug 60 for the RJ-45 jack 30.

The uNID base plate 18 includes a pair of hinge assemblies 5, which allow the uNID base plate 18 to be mounted and swung in an enclosure. uNID base plate 18 may include a keeper/retention bracket 6, which is temporarily removed or loosened and rotated approximately 90 degrees counter clockwise in order for the uNID base plate 18 to be mounted on hinges in an enclosure and re-attached/rotated after the uNID base plate 18 is mounted in the enclosure. The keeper/retention bracket 6 prevents accidental removal of the uNID base plate 18. Without the keeper/retention bracket 6, uNID base plate 18 could easily become dislodged and slip off the enclosure hinges when uNID base plate 18 is swung by the technician in the field, thereby causing damage to the underlying components below. The uNID base plate 18 cannot be installed or removed with keeper/retention bracket 6 in place.

uNID base plate 18 includes several lance type tie down features 7 that can be used for wire/fiber management devices. uNID base plate 18 includes flanges 20, 21 and 24, which help keep the access module 2 and modem module 3 in place. Flange 24 also provides additional thermal mass to the plate to help sink heat from the modem module 3. uNID base plate 18 includes a flange/handle 19, which allows the technician to more easily swing the uNID base plate 18 when it is in an enclosure. uNID base plate 18 includes a retention bolt 23 which is used to attached the uNID base plate 18 to an enclosure so that it cannot swing.

Figure 4:
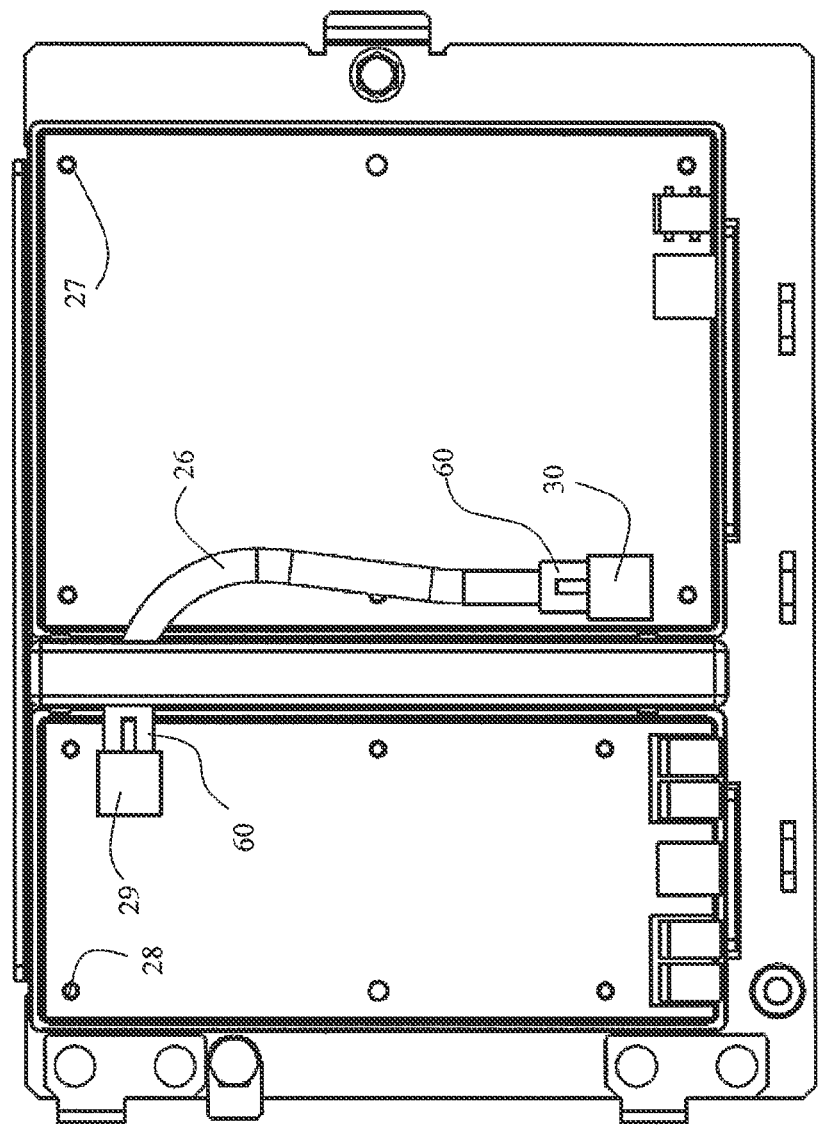
FIG. 4 shows a transparent view of an embodiment of a uNID base module.
Figure 5:
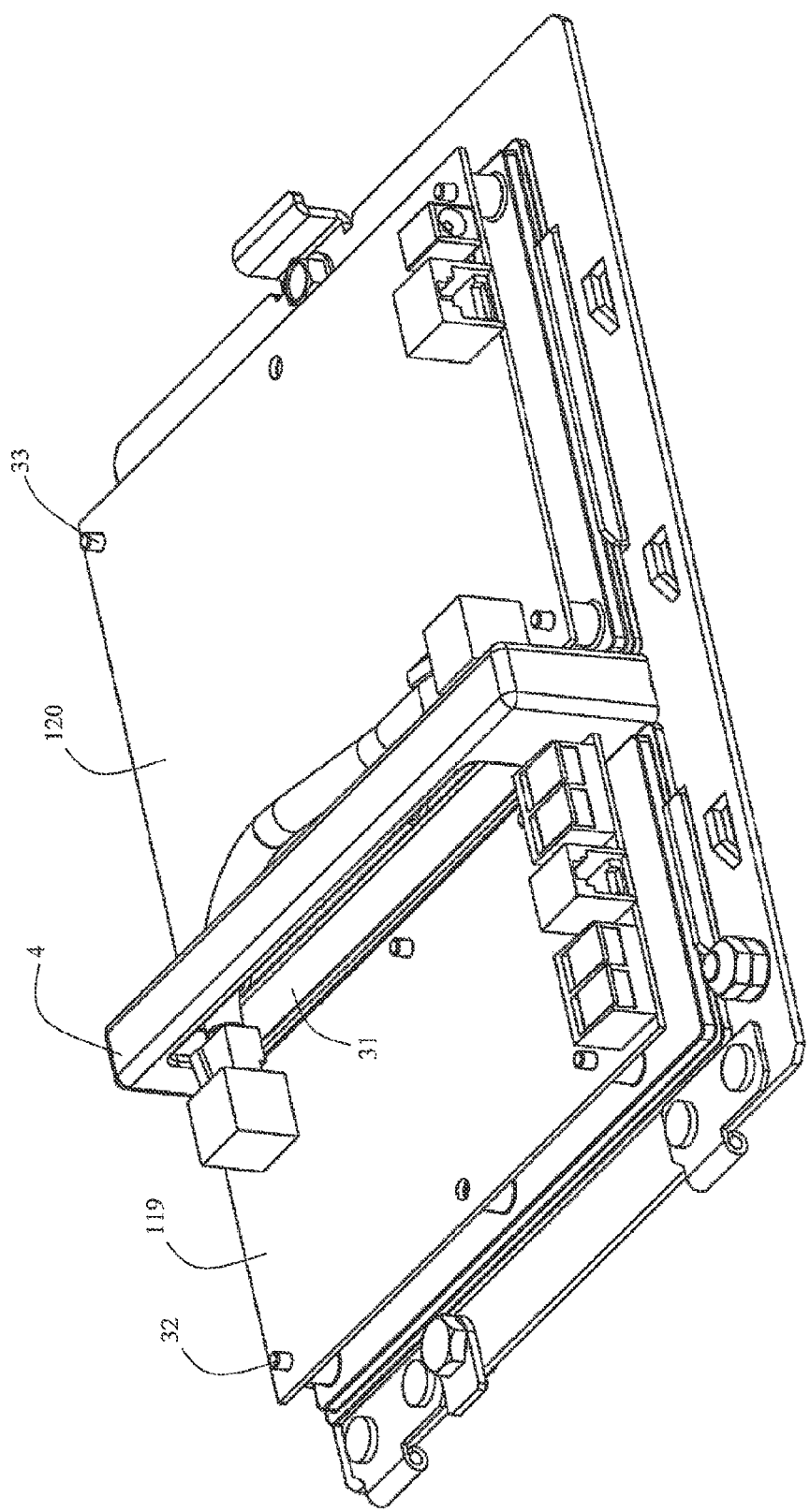
FIG. 5 shows a transparent isometric view of an embodiment of a uNID base module.

FIG. 4 shows a transparent view of an embodiment of a uNID base module. FIG. 5 shows a transparent isometric view of an embodiment of a uNID base module. The uNID access module 2 (all variants) and the uNID modem module 3 (all variants) are connected with a cable, such as a CAT 7 cable 26. This cable is housed internally within the uNID base module 1. Each end of cable 26 has a RJ-45 connector 60, which can be inserted into the RJ-45 interconnects 29 and 30. The uNID access module 2 and uNID modem module 3 have holes 28 and 27, which can be used to mount the printed circuit boards 191, 120 in the respective modules to the uNID base plate 18 with bolts/studs 32 and 32, for example. FIG. 5 shows that the dividing structure 4 has an opening 31, through which cable 26 extends. Dividing structure 4 can be made of plastic or any other suitable material, such as aluminum casting.

While the embodiment shown in FIGS. 4 and 5 show a cable 26 for connecting the two modules, the two modules could also be electrically connected by any commonly know board to board connectors. If a board to board connectors are used, the use of the dividing structure would be optional.

Figure 6:
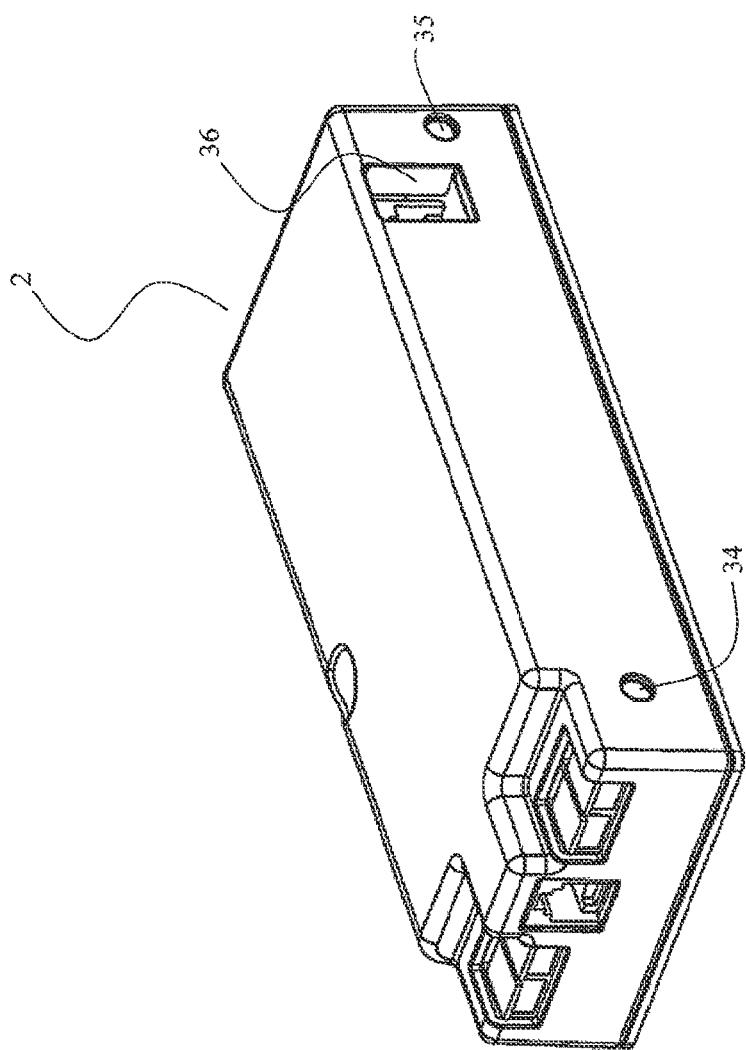
FIG. 6 shows an isometric view of an embodiment of a uNID access module.
Figure 13:
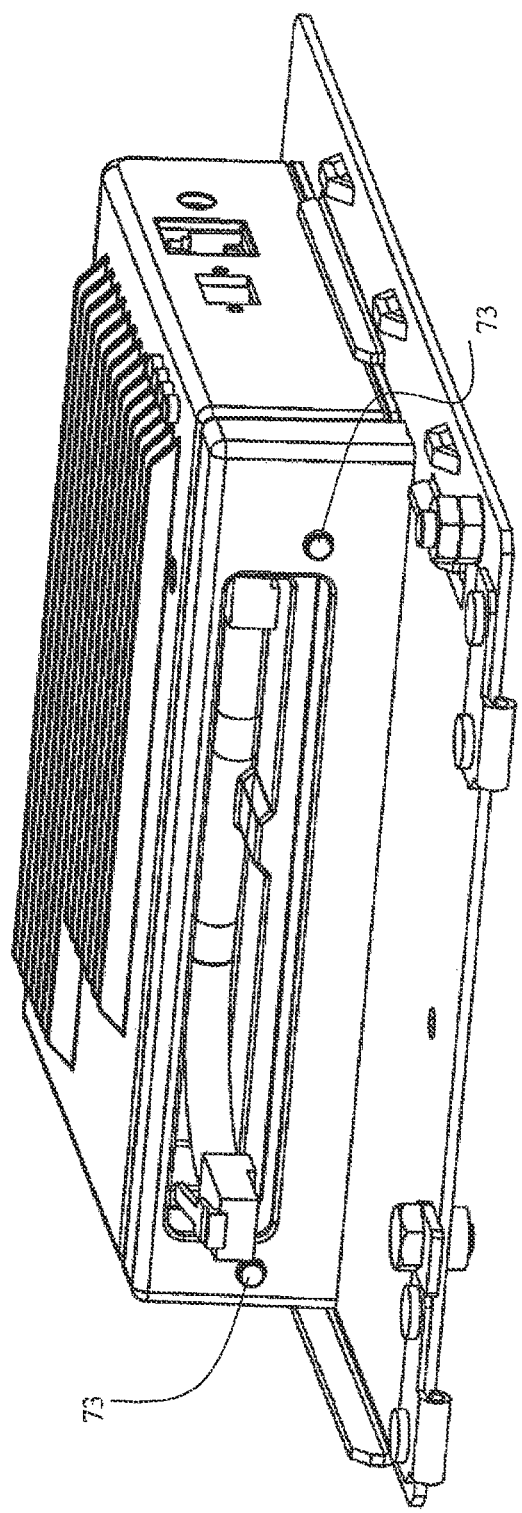
FIG. 13 shows a side isometric view of an embodiment of a uNID modem module on uNID base plate.

FIG. 6 shows an isometric view of an embodiment of a uNID access module 2. There are three uNID access module variants: one-line xDSL access module; two-line xDSL access module; and GPON access module. The two-line xDSL access module variant is shown. The side of uNID access module 2 contains two detents 34 and 35. Detents 34 and 35 line up with keys/locators/protrusions 73, as shown in FIG. 13. It is the combination of these detents 34, 35 and the flanges 20, 24 on uNID base plate 18 that help locate the uNID access module 2 in the correct position so that when the module has been slid along the flange and butts against dividing structure 4, the mounting screw 69 is properly aligned and ready for securing the modules to the tapped hole in the uNID base plate 18. Since the tapped holes in the swing frame plate are underneath the modules it is difficult to know where the hole is when attempting the start the screw into the hole as this is a "blind type" mount and the method discussed above helps eliminates any guess work as to screw hole location.

Figure 7:
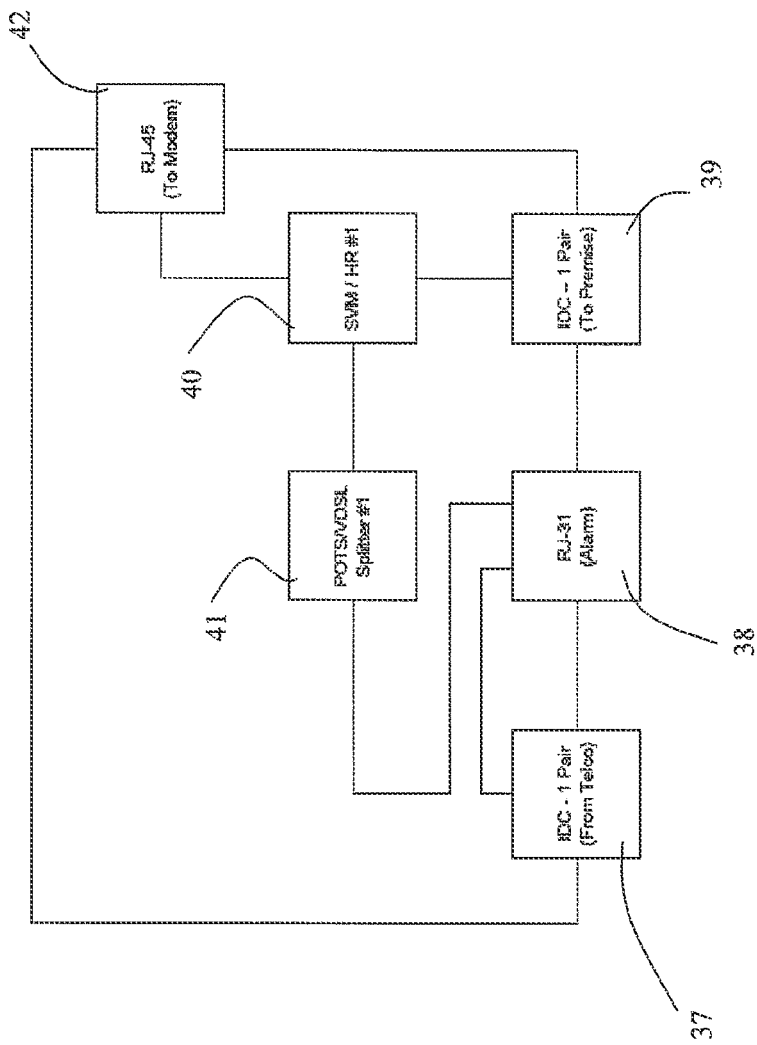
FIG. 7 shows a schematic of an embodiment of a one line uNID access module.

FIG. 7 shows a schematic of some of the features of an embodiment of a one line uNID access module. They include IDC connector 37 (from the telephone office); RJ-31 input 38 (alarm); Power-Over-Ethernet (not shown); RJ-45 interconnect 42 (CAT 7 cable to modem module); IDC connector 39 (to premise). Other components include: POTS/xDSL Splitter 41 (POTS (DC to 4 kHz)) and xDSL (25 kHz to 8.5 MHz)—other xDSL band plans possible); switchable voice module (SVM), which controls voice switching between POTS and VoIP, and half-ringer (HR) 40. Other possible options include: switch to place SVM in-line or bypass SVM; and SVM status LEDs. Multiple variants are possible due to number of VDSL band plans.

Figure 8:
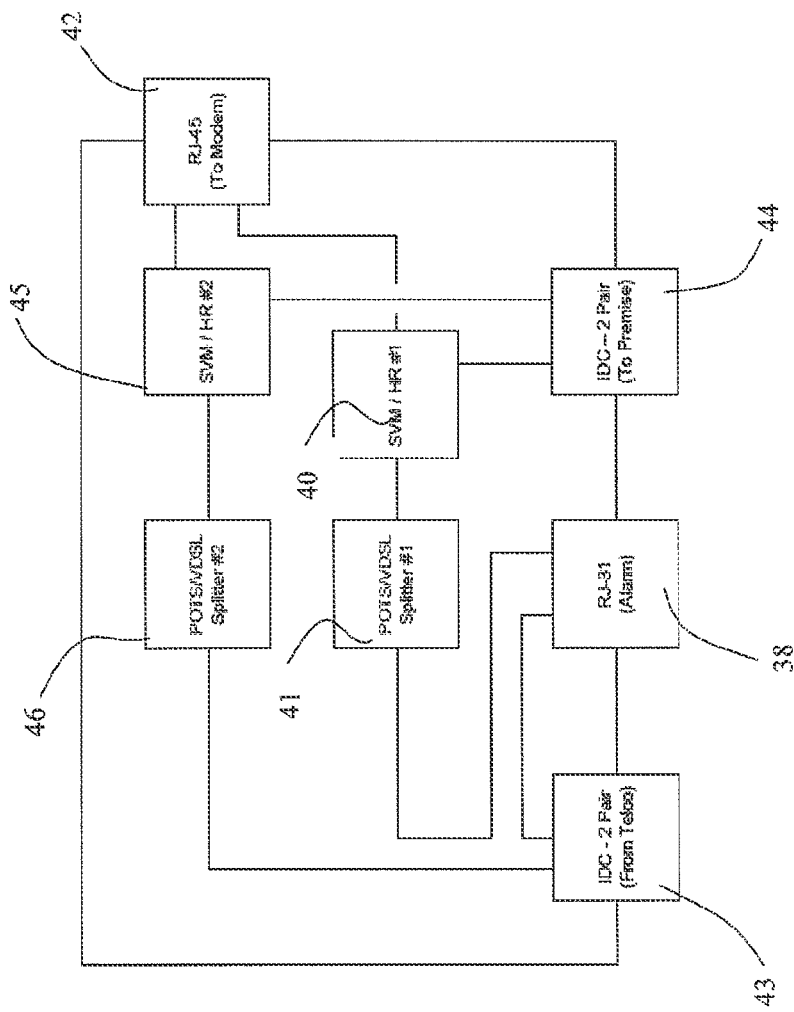
FIG. 8 shows a schematic of an embodiment of a two line uNID access module.

FIG. 8 shows a schematic of some of the features of an embodiment of a two line uNID access module. They include IDC connector 43 for lines 1 and 2 (from the telephone office); RJ-31 input 38 (alarm); power-over-Ethernet (not shown); RJ-45 interconnect 42 (CAT 7 cable to modem module); IDC connector 44 for lines 1 and 2 (to premise (bi-directional)). Other components include: POTS/xDSL Splitter 41 (POTS (DC to 4 kHz) and xDSL (25 kHz to 8.5 MHz))—other xDSL band plans possible); switchable voice module (SVM), which controls voice switching between POTS and VoIP, and half-ringer (HR) 40; POTS/xDSL Splitter 46 (POTS (DC to 4 kHz) and xDSL (25 kHz to 8.5 MHz))—other xDSL band plans possible); switchable voice module (SVM), which controls voice switching between POTS and VoIP, and half-ringer (HR) 45; Other possible options include: switch to place SVM in-line or bypass SVM; and SVM status LEDs. Multiple variants are possible due to number of xDSL band plans.

Figure 9:
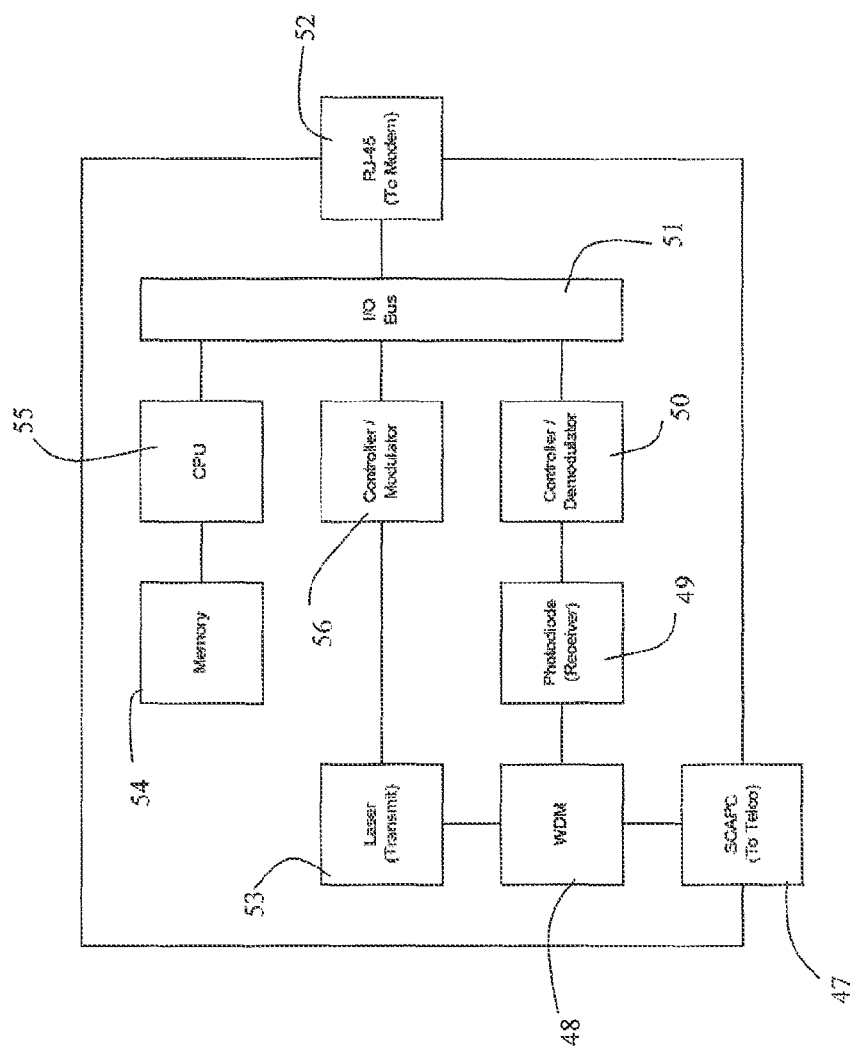
FIG. 9 shows a schematic of an embodiment of a gigabit-capable passive optical network (GPON) uNID access module.

FIG. 9 shows a schematic of some of the features of an embodiment of a gigabit-capable passive optical network (GPON) uNID access module. They include SCAPC bulkhead 47 (single-fiber single mode input) (other connectors could be used (SCUPC, LCAPC, LCUPC, etc.); power-over-Internet (not shown); RJ-45 interconnect 52 (CAT 7 cable to modem module). Other components include: WDM 48 (1310/1550 shown with 1550 downstream and 1310 upstream, 1310/1490+1550 (tri-band WDM possible)); transmitter laser 53 and controller/modulator 56 (upstream transmitter); receiver photodiode 49 and controller/demodulator 50 (downstream receiver); input/output (I/O) Bus 51 (memory buffer not shown); microprocessor/CPU 55 (overall controller). Other design options include GPON status lights. Multiple variants are possible due to number of PON variants (B-PON, GE-PON, etc.).

Figure 10A:
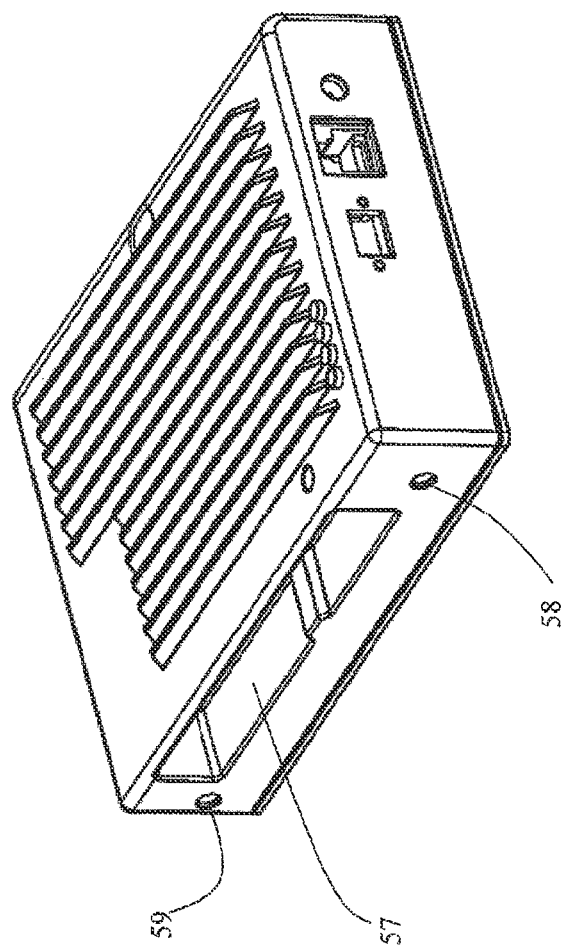
FIGS. 10a and 10b show top and bottom isometric view of an embodiment of a uNID Modem Module.
Figure 10B:
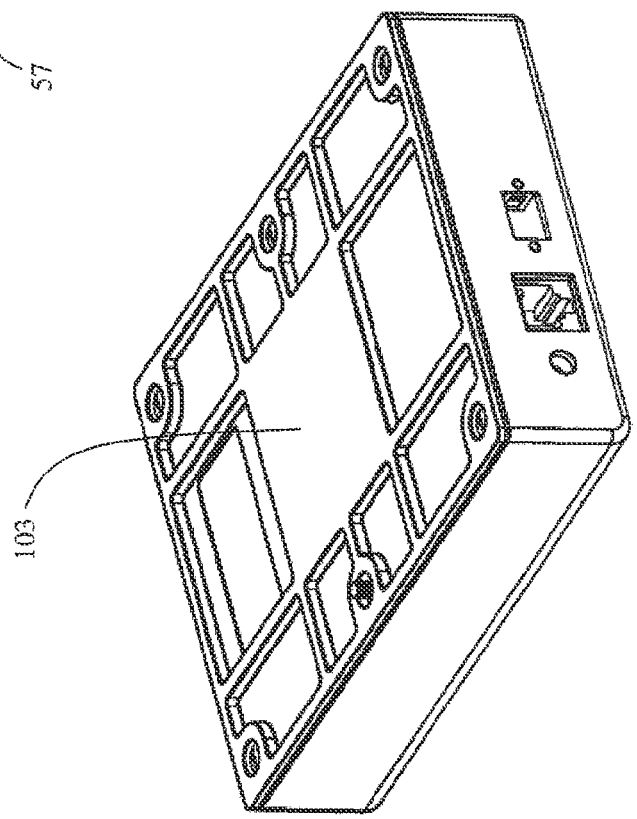

FIGS. 10a and 10b show top and bottom isometric view of an embodiment of a uNID modem module 3. uNID modem module shown is cast aluminum. Other materials may be used as needed based on modem heat generation. A grid pattern 103 is formed into the bottom of the uNID modem module 3 to facilitate heat transfer to the uNID base plate 18. In addition an interconnect cable pocket 57 is shown. The side of uNID modem module 3 contains two detents 58 and 59. Detents 58 and 59 line up with keys/locators/protrusions similar to keys/locators/protrusions 73 that are on the opposite side of dividing structure 4, as shown in FIG. 13. It is the combination of these detents 58, 59 and the flanges 21, 24 on uNID base plate 18 that help locate the uNID access module 3 in the correct position so that when the module has been slid along the flange and butts against dividing structure 4, the mounting screw 74 is properly aligned and ready for securing the modules to the tapped hole in the uNID base plate 18. Since the tapped holes in the swing frame plate are underneath the modules it is difficult to know where the hole is when attempting the start the screw into the hole as this is a "blind type" mount and the method discussed above helps eliminates any guess work as to screw hole location.

Figure 11:
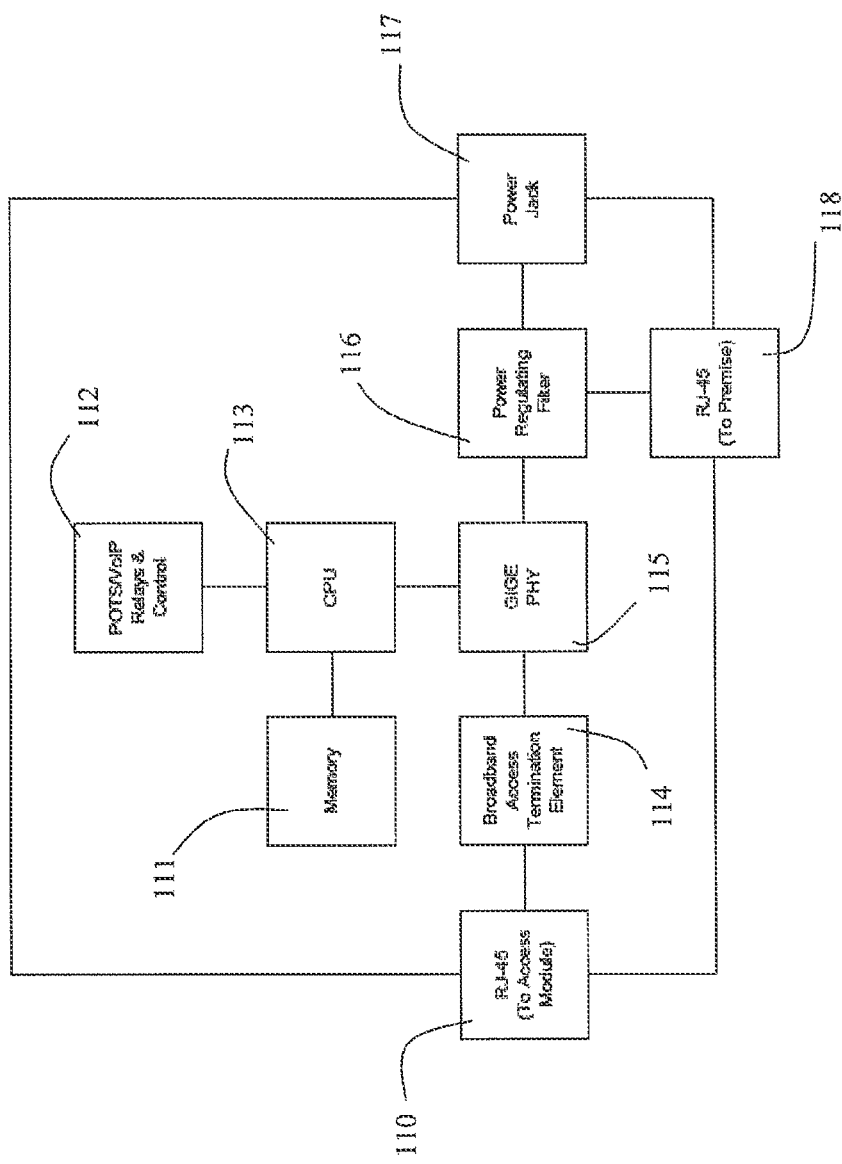
FIG. 11 shows a schematic of an embodiment of an uNID modem module.

FIG. 11 shows a schematic of some of the features of an embodiment of a uNID modem module 3. They include a power-over-Ethernet or power jack 117; CPU 113 with memory 111 (such as flash and RAM); GigE/Phy Bus 115; a power regulating filter 116; a POTS/VoIP relay and control 112; broadband access termination element 114, which can support ADSL/ADSL 2+, VDSL/VDSL2+, SHDSL bonded, and GPON; a RJ-45 interconnect 110 (for connection to the uNID access module 2); and RJ-45 connector 118 (to premise).

Figure 12:
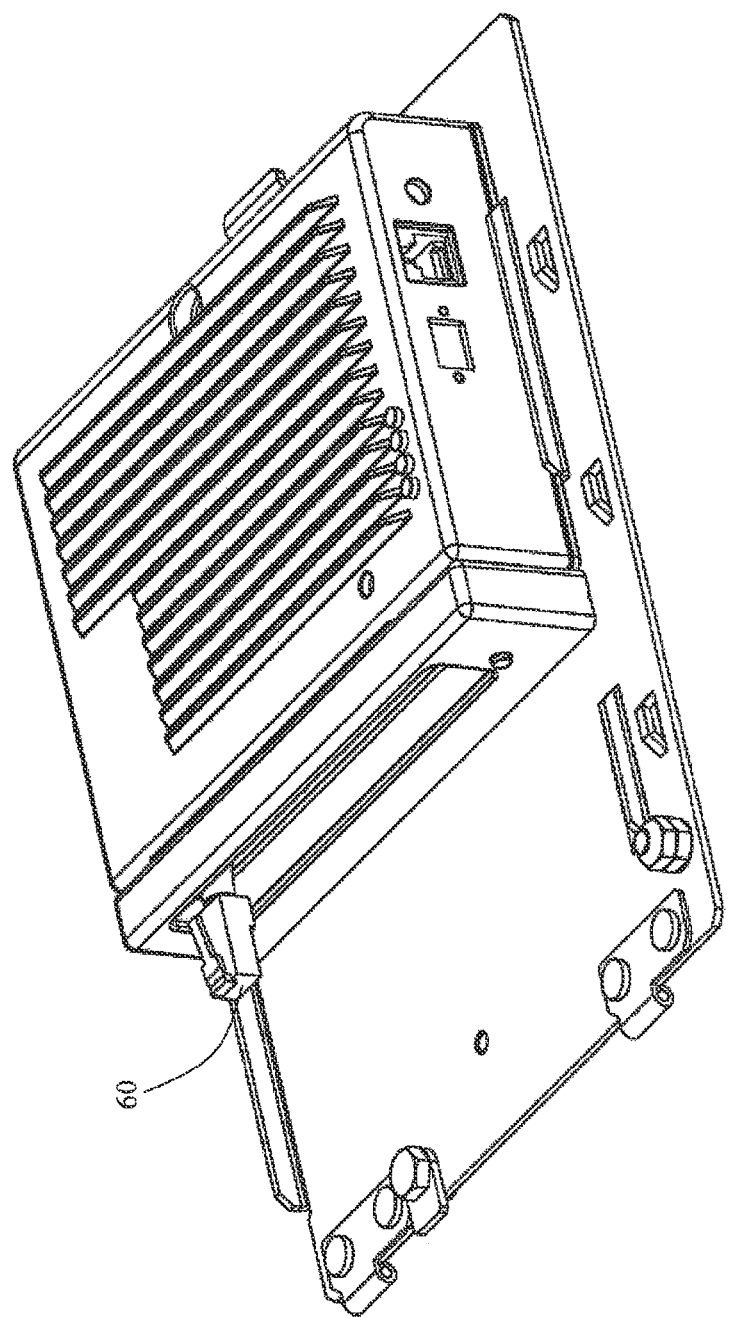
FIG. 12 shows an isometric view of an embodiment of a uNID modem module on uNID base plate.

FIG. 12 shows an isometric view of an embodiment of a uNID Modem Module on uNID base plate 18.

FIG. 13 shows a side isometric view of an embodiment of a uNID modem module on uNID base plate 18.

Figure 14:
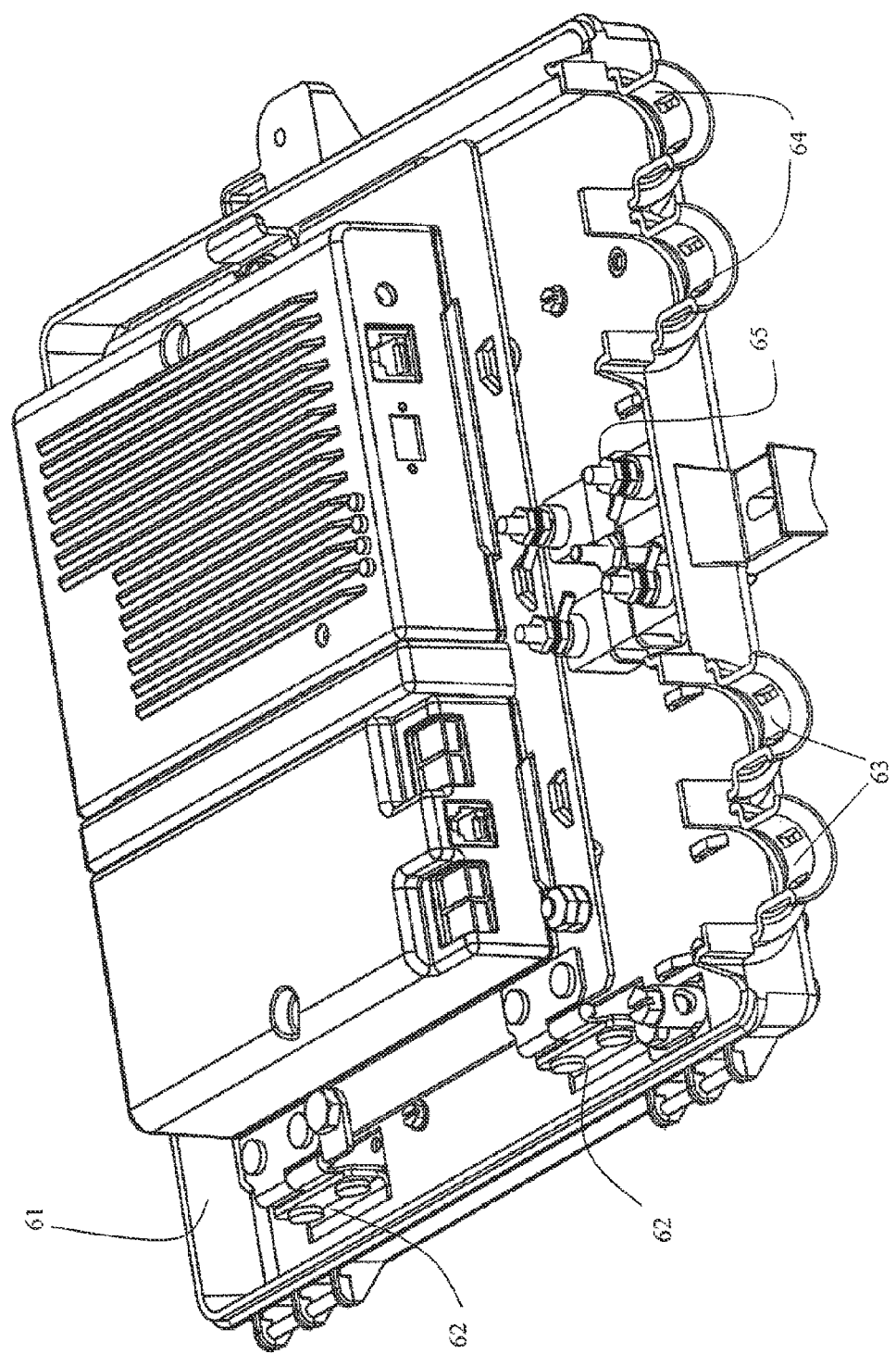
FIG. 14 shows an embodiment of uNID base module attached to a NID base.

FIG. 14 shows an embodiment of uNID base module attached to a NID base 61. The uNID base plate hinges 5 are attached to hinges 62 on the NID base 61. A typical NID base 61 will have several openings 63 and 64 through which cables can be attached to the uNID access module and uNID modem module. A typical NID base 61 may also have gas protectors 65 provide lightning surge protection.

Figure 15:
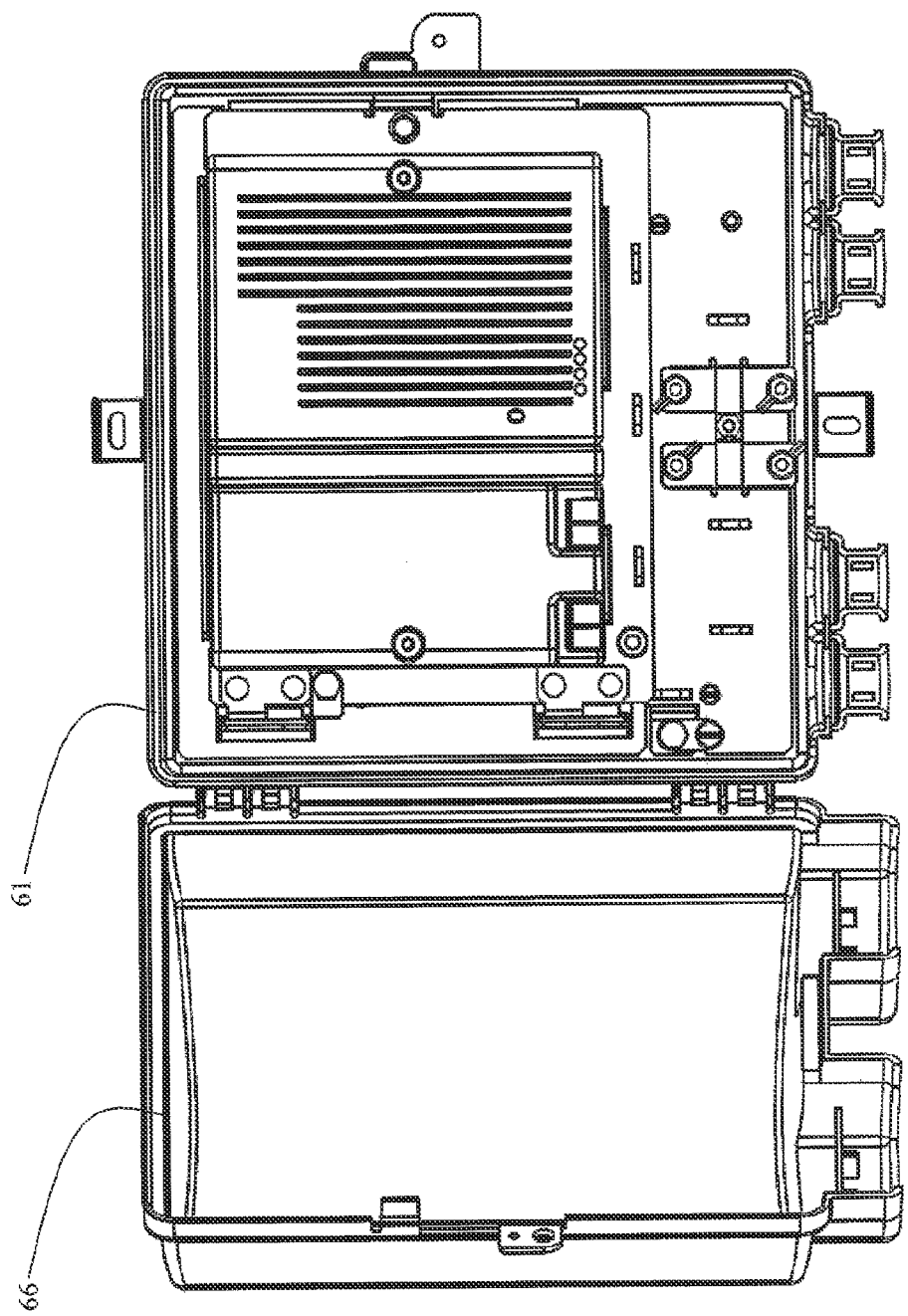
FIG. 15 shows a plan view of an embodiment of a uNID base module installed on hinge plate assembly in a NID.

FIG. 15 shows a plan view of an embodiment of a uNID base module installed on hinge plate assembly in a NID 61 with a cover 66.

Figure 16:
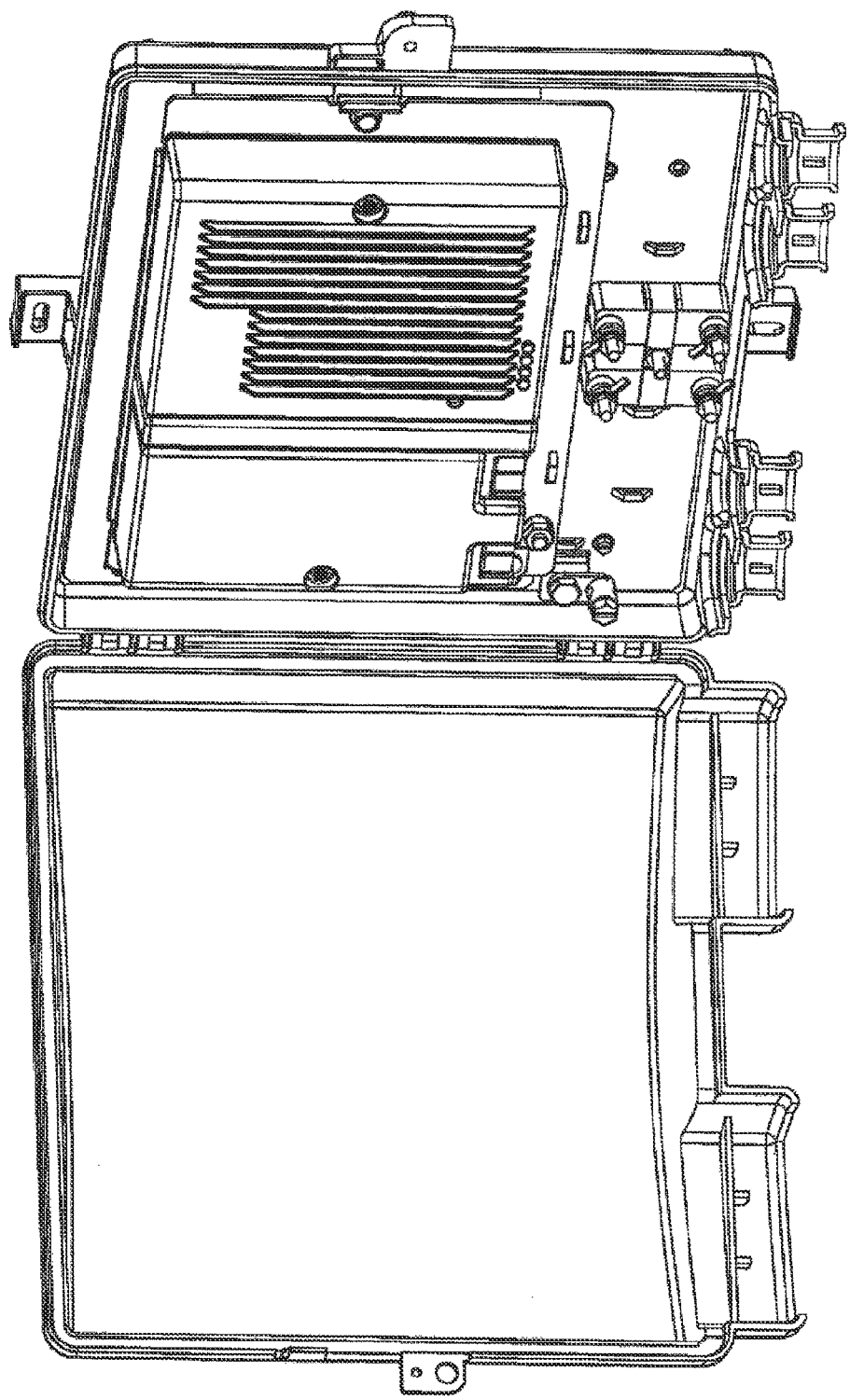
FIG. 16 shows an isometric view of an embodiment of a uNID base module installed on hinge plate assembly in a NID.

FIG. 16 shows an isometric view of an embodiment of a uNID base module installed on hinge plate assembly in a NID.

Figure 17:
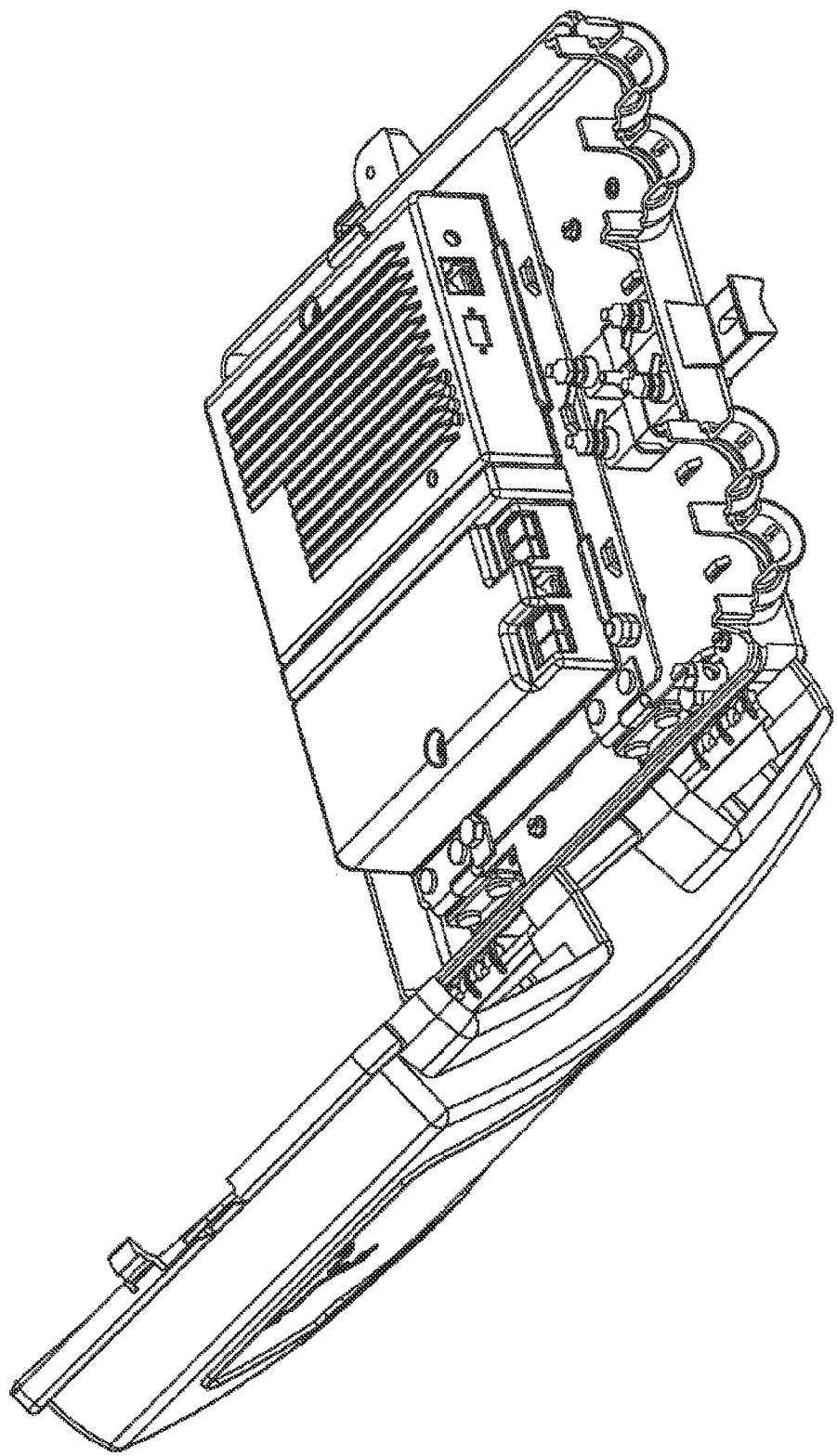
FIG. 17 shows an isometric view of an embodiment of a uNID base module on hinge plate assembly.

FIG. 17 shows an isometric view of an embodiment of a uNID base module on hinge plate assembly.

Figure 18:
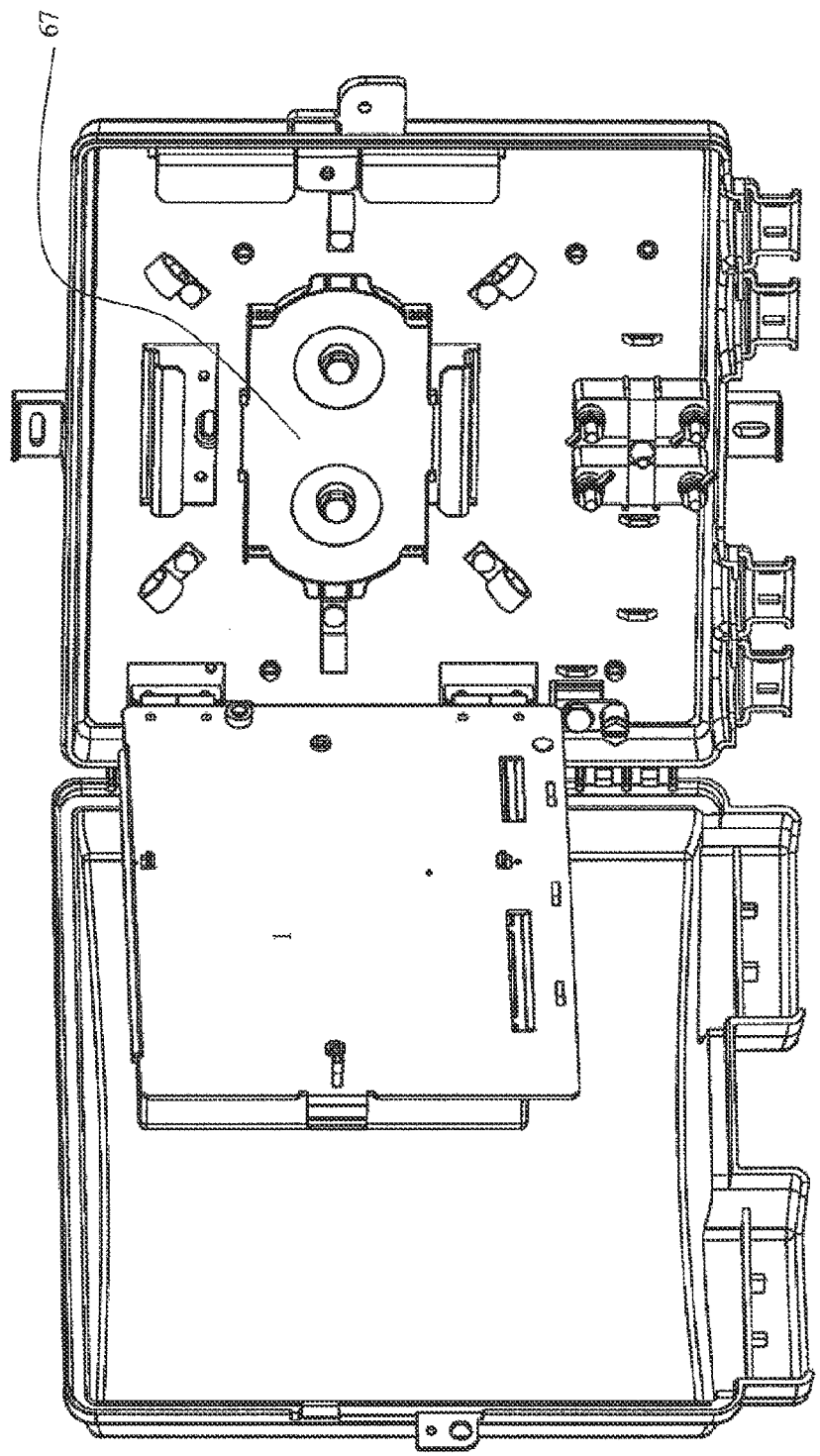
FIG. 18 shows an isometric view of an embodiment of a uNID base module on open hinge plate assembly.

FIG. 18 shows an isometric view of an embodiment of a uNID base module on open hinge plate assembly. The uNID base plate 18 defines two interior compartments. The upper compartment is the area above the uNID base plate 18. The lower compartment 67 is the area below the hinge plate assembly and a surface of the NID. This lower compartment can serve as a storage area where a secondary module, such as a satellite TV interconnect Box, can be installed, or other components can be stored.

Figure 19:
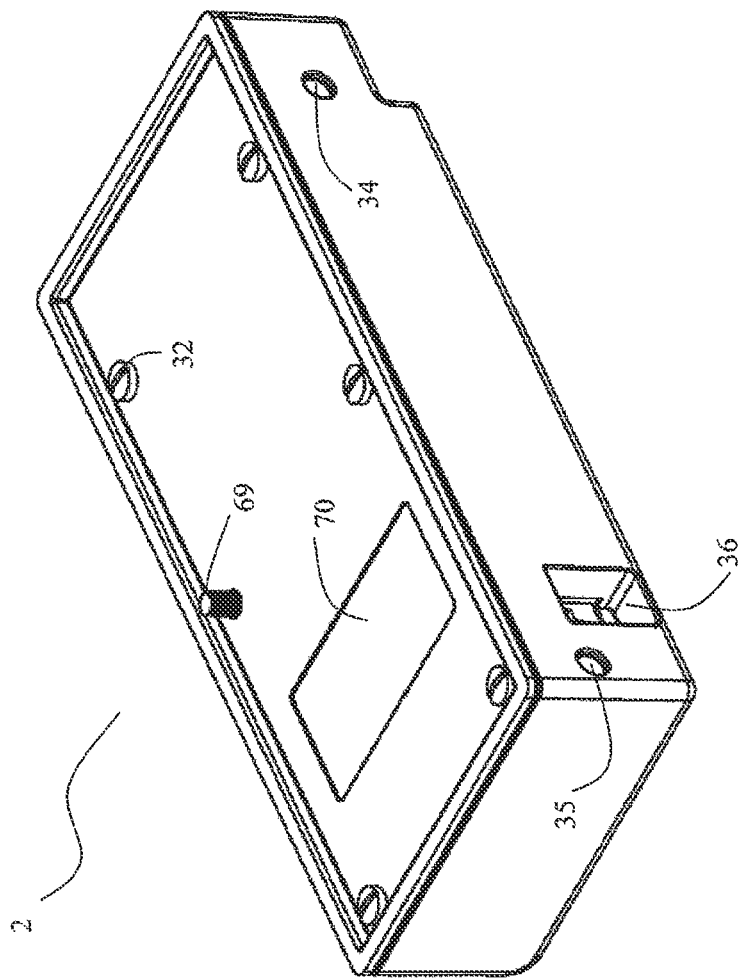
FIG. 19 shows a bottom view of an embodiment of a uNID access module.

FIG. 19 shows a bottom view of an embodiment of a uNID access module 2. Screws/bolts 32 are used to attach a printed circuit board 119 to the access module housing. These screws/bolts 32 mechanically and electrically (ground) join the uNID access module lid, printed circuit board 119, and uNID base plate 18. It also shows the bolt 69 that is used to attached the uNID access module 2 to the uNID plate 18. Depression 70 is a location for a product identification label.

Figure 20:
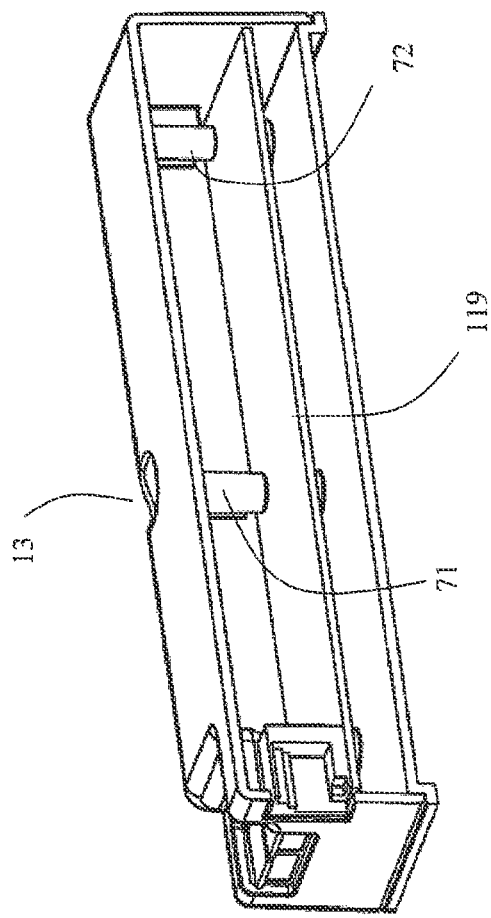
FIG. 20 shown a side view of an embodiment of an access module.

FIG. 20 shown a side view of an embodiment of a uNID access module 2. It shows standoffs 71 and 72 which keep the printed circuit board 119 in place.

Figure 21:
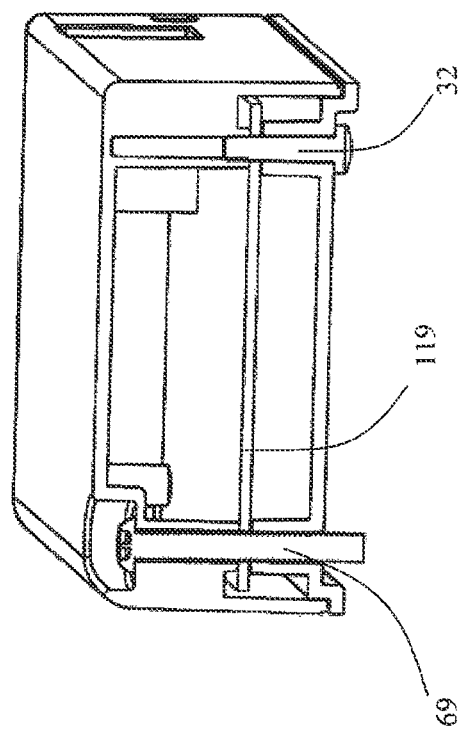
FIG. 21 shows an end view of an embodiment of an access module.

FIG. 21 shows an end view of an embodiment of a uNID access module 2.

Figure 22:
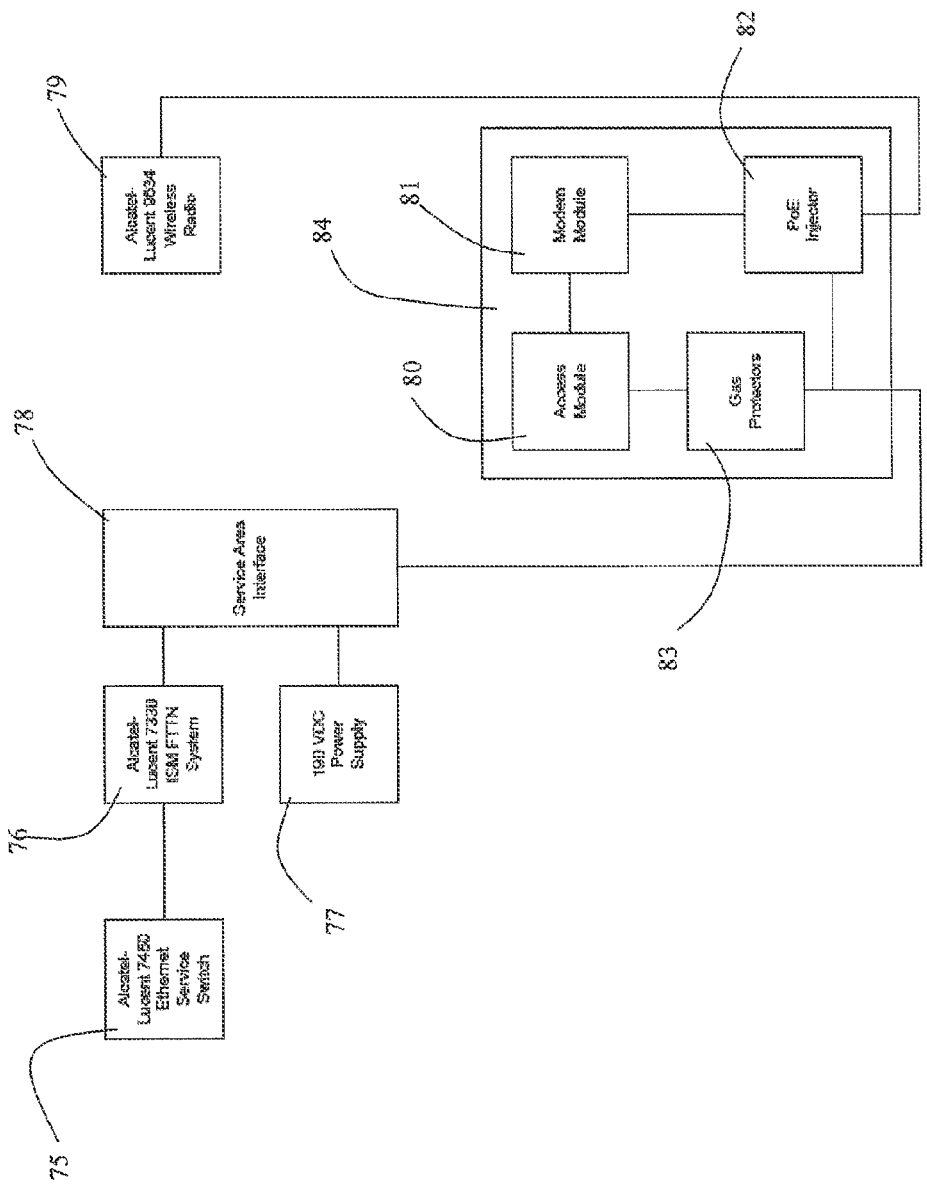
FIG. 22 is a system diagram of a typical FTTN/xDSL network.

FIG. 22 is a system diagram of a typical FTTN/xDSL network. An Ethernet service switch 75 (such as an Alcatel-Lucent 7450) is installed in a central office and connected to a fiber optic backbone F1 cable. The Ethernet service switch 75 transmits voice, data/internet, and video content downstream to the ISM FTTN system 76 (such as the Alcatel-Lucent 7330), and receives voice and data/internet service content upstream from the ISM FTTN System. The ISM FTTN system 76 is connected to the service area interface 78 (SAI) by a copper F2 trunk. The ISM FTTN system 76 transmits voice, data/internet, and voice content in an xDSL format to and receives voice, and data/internet content in a DSL format from specific F2 copper lines at a service area interface cabinet. Power is also supplied to the service area interface 78 by a 190 VDC power supply 77.

A number of copper F2 twisted pair lines are assigned a specific universal modem/gateway 84. At least one, but typically two, twisted pair lines are designed to carry both voice, data, and video content in an xDSL and DC power. The DC power is used to power the universal modem/gateway 84. At least one, but possibly two, twisted pair lines are designed to carry DC power to the wireless radio 79 connected to the universal modem/gateway 84. This DC power is provided by a modem with the ISM FTTN system but could be provided by a separate unit.

The universal modem/gateway 84 performs the following functions. It provide a demarcation point between the landline telephony network and the wireless network. It separates DC power from xDSL signal in access module, and provides front end filtering of bidirectional DSL signal to and from the modem. Power and xDSL information is provided to the modem module 80 via an internal interconnect cable. It also provides a means to combine modem Ethernet input/output and addition power lines to the wireless radio 79 using a single cable. A example of a wireless radio 79 is the Alcatel-Lucent Metrocast 9364. It also provides a means to install ancillary equipment near the wireless radio 79. The universal modem/gateway also includes gas protectors 84 to provide lightning surge protection to the access module 80 and modem module 81. A power/Ethernet cross-connect block 82 combines modem input/output cable and additional power lines into a single cable.

Figure 23:
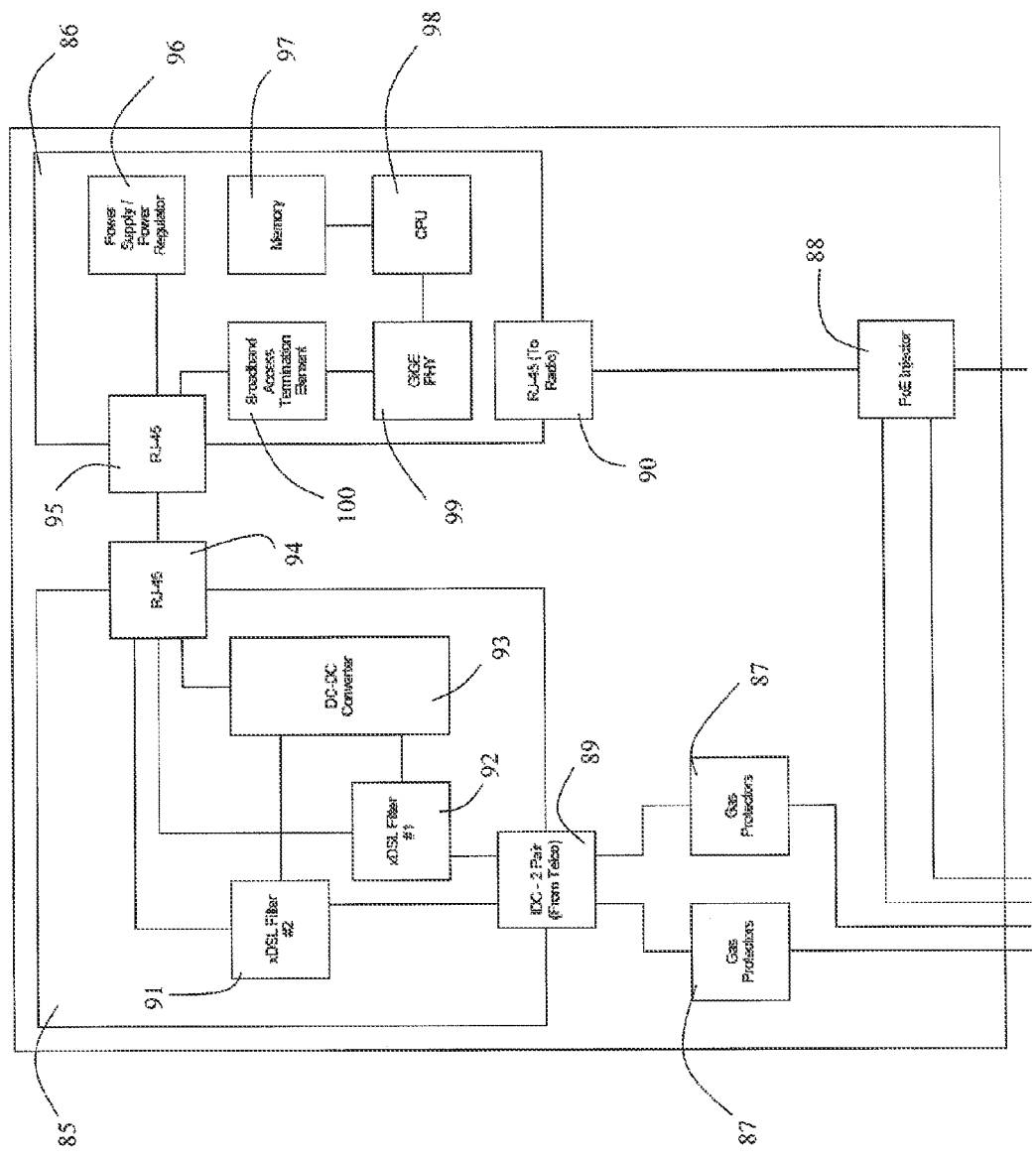
FIG. 23 is a functional diagram of an embodiment of a wireless uNID base module.

FIG. 23 is a functional diagram of an embodiment of a wireless uNID base module. The uNID base module includes the following. A uNID access module 85. A two line uNID access module 85 is shown with the input coming through IDC connector 89. A one-line version could be implemented based on carrier need. The uNID access module 85 separates DC power from xDSL signal for both lines (93). The uNID access module 85 provides front-end filtering of the xDSL signal (91, 92). The uNID access module 85 provides a single output through a RJ-45 connector 94 to the uNID modem module 86 with up to two xDSL lines and up to two DC power lines.

Gas protectors 87 provide lightning surge protection to the uNID access module 85 and uNID modem module 86.

uNID modem module 86 provides communication to/from the ISM FTTN system and to/from wireless radio, from RJ-45 connector 90. The uNID modem module includes a power supply/power regulator 96; CPU 98 with memory 97 (such as flash and RAM); GigE/Phy Bus 99; a broadband access termination element 100, which can support ADSL/ADSL 2+, VDSL/VDSL2+, SHDSL bonded, and GPON; a RJ-45 interconnect 95 (for connection to the uNID access module 85).

The power/Ethernet cross-connect block 88 combines modem input/output cable and additional power lines into a single cable.

Figure 24:
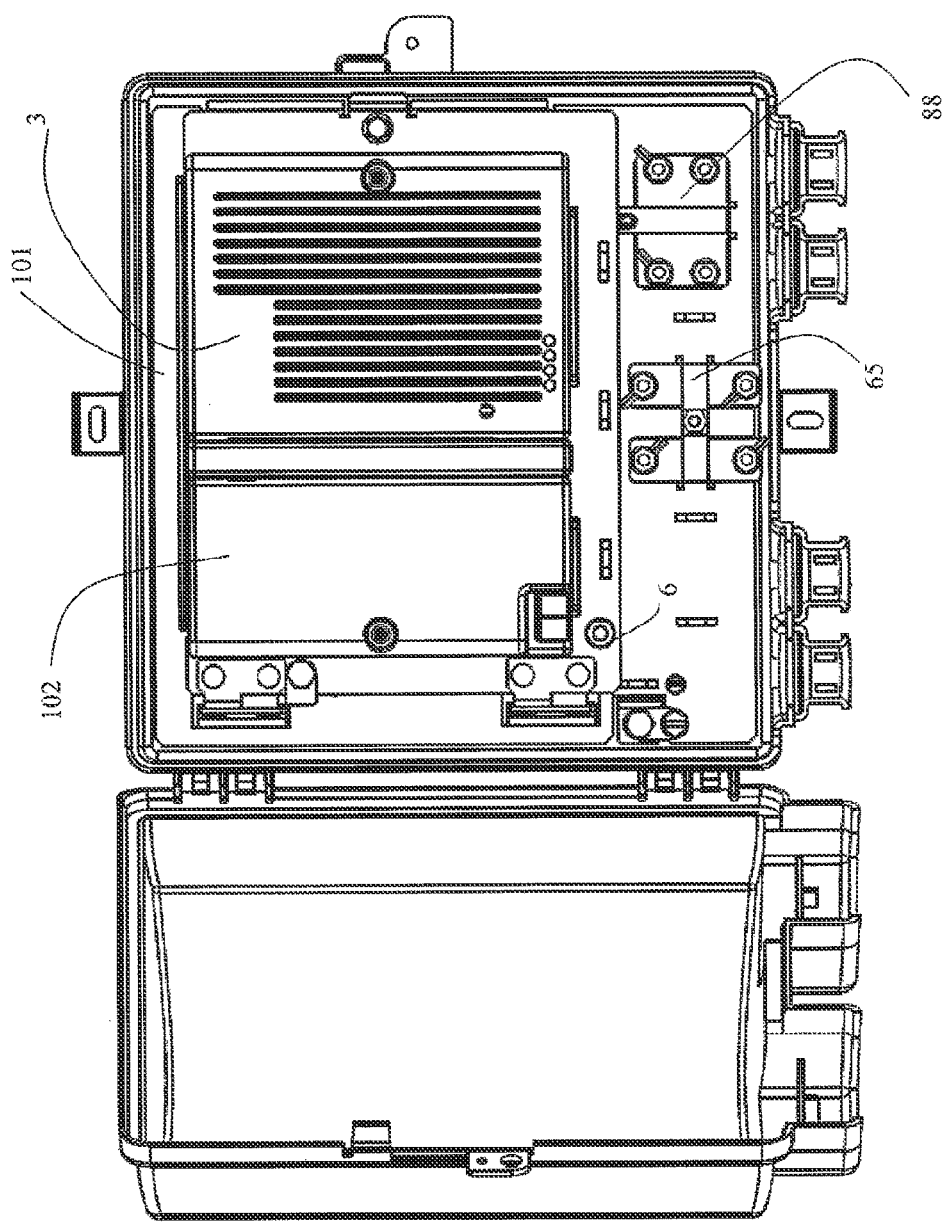
FIG. 24 is a plan view of an embodiment of a wireless uNID base module.
Figure 25:
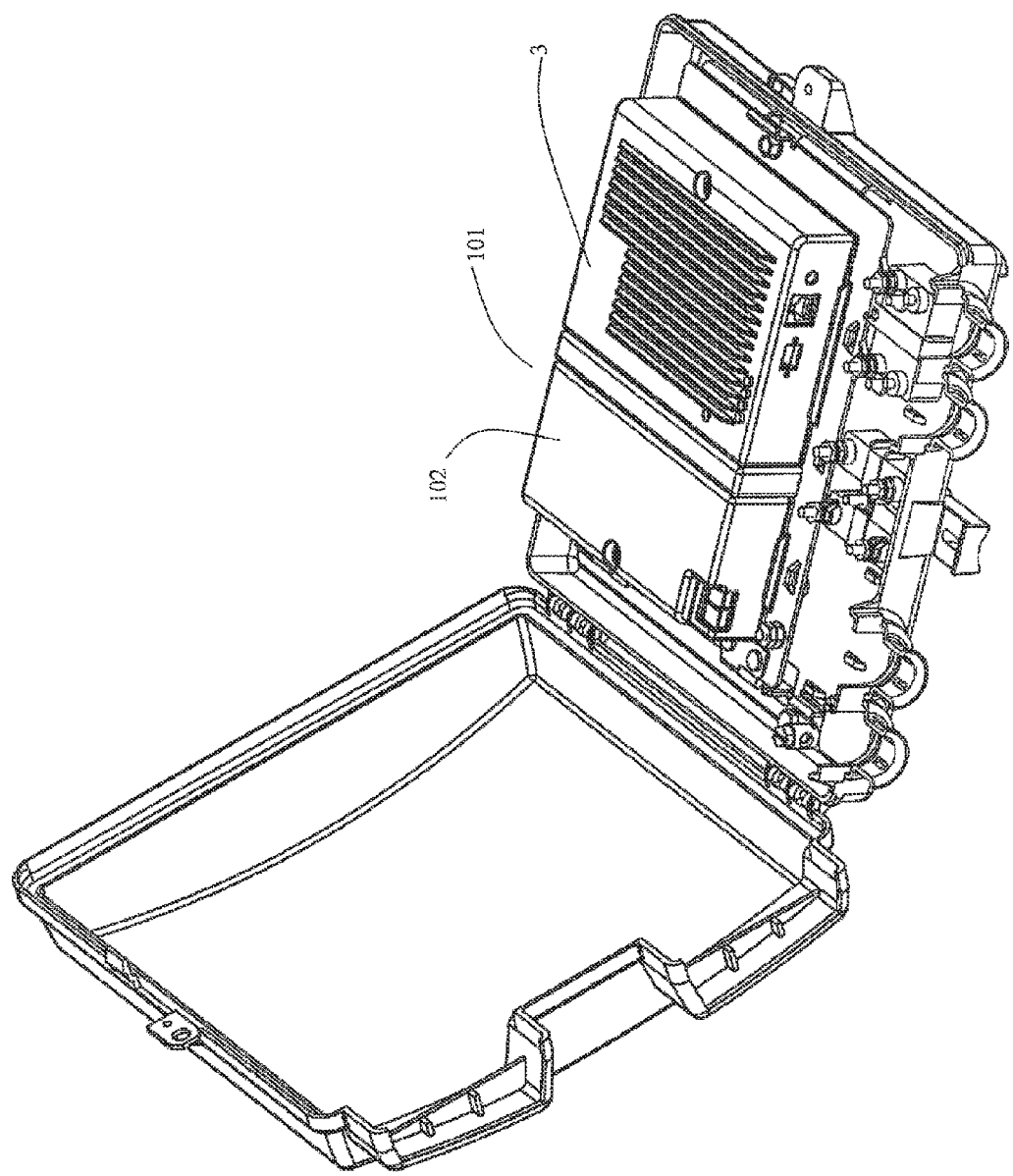
FIG. 25 is an isometric view of an embodiment of a wireless uNID base module.
Figure 26:
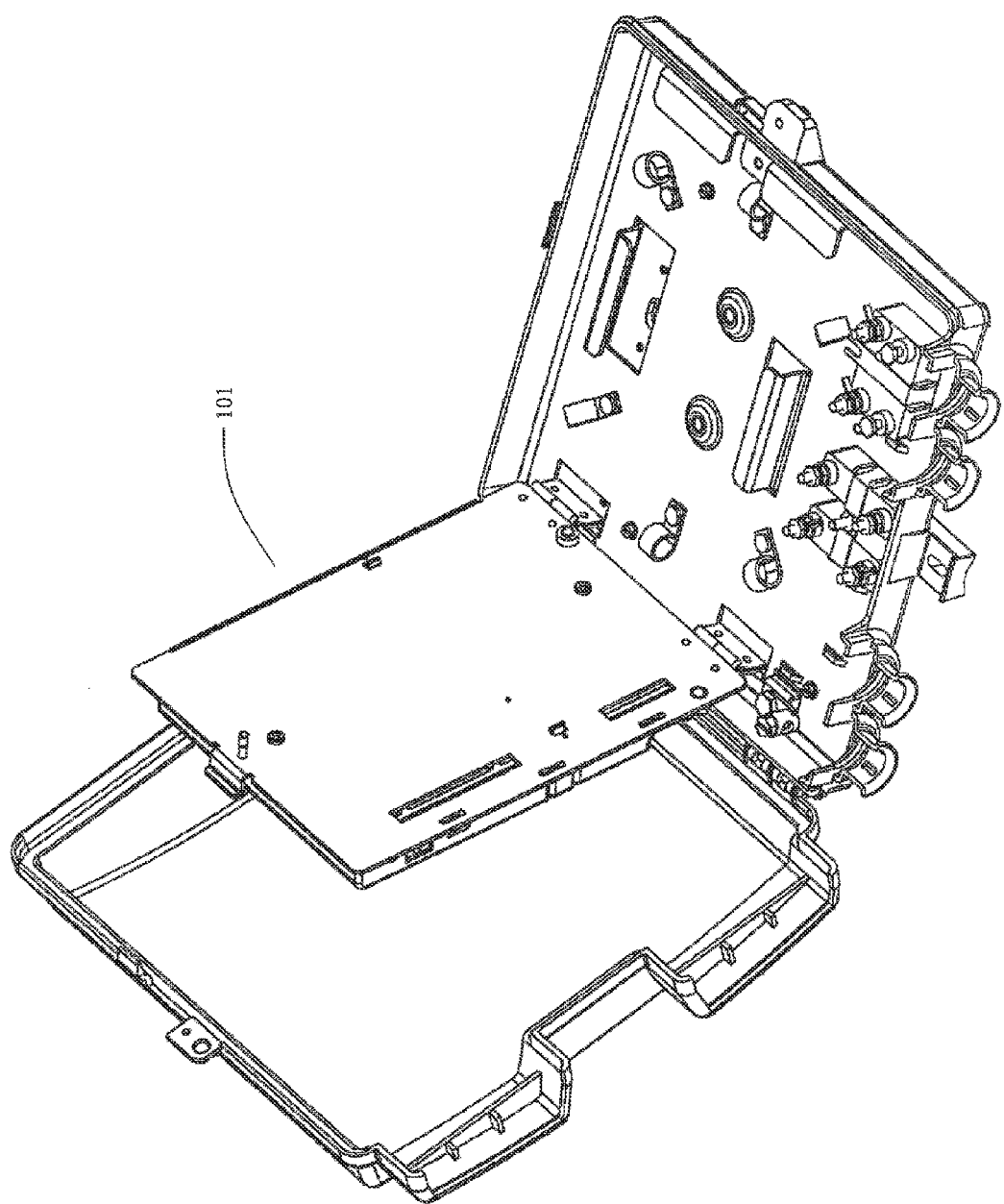
FIG. 26 is an isometric view of an embodiment of a wireless uNID base module.

FIGS. 24 to 26 show views of an embodiment of a wireless uNID base module 101 in a NID. uNID access module 102 and uNID modem module 3 are installed on a uNID base plate 18. The uNID base plate 18 is attached to the NID by hinges as discussed above. Gas Protectors 65 are installed at the bottom center of the NID for easy connection to ground wires and the uNID access module 102. A power/Ethernet cross-connect block 88 is installed in the lower right-hand corner of the NID.

Typical cable routing configuration is as follows: Input copper cables enter the NID in one or both of the left-hand entry ports. This cable is routed clockwise around the box. The pairs carrying the xDSL signal and DC power are connected to the gas Protectors. A ground wire is connected to the stud 6 on the uNID base plate 18 that both gas protectors are connected to.

A twisted pair jumper is connected from the gas protector posts to the uNID access module 102 input IDCs. An interconnect cable connects uNID access module 102 and uNID modem module 3.

The modem input/output is routed clockwise and connects to the power/Ethernet cross-connect block. The input cable pairs carrying dc power only are routed clockwise around the NID and connected to the power/Ethernet cross-connect block.

The radio Ethernet cable enters the NID in the lower right-hand corner. This cable is routed counter-clockwise around the NID and is connected to the Power/Ethernet Cross-Connect Block.

Figure 27:
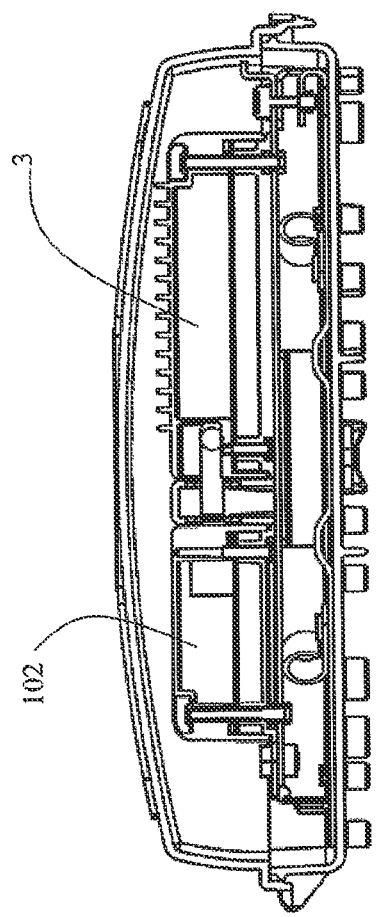
FIG. 27 is a cross-sectional view of an embodiment of a wireless uNID base module.

FIG. 27 is a cross-sectional view of an embodiment of a wireless uNID base module in a NID.

Figure 28:
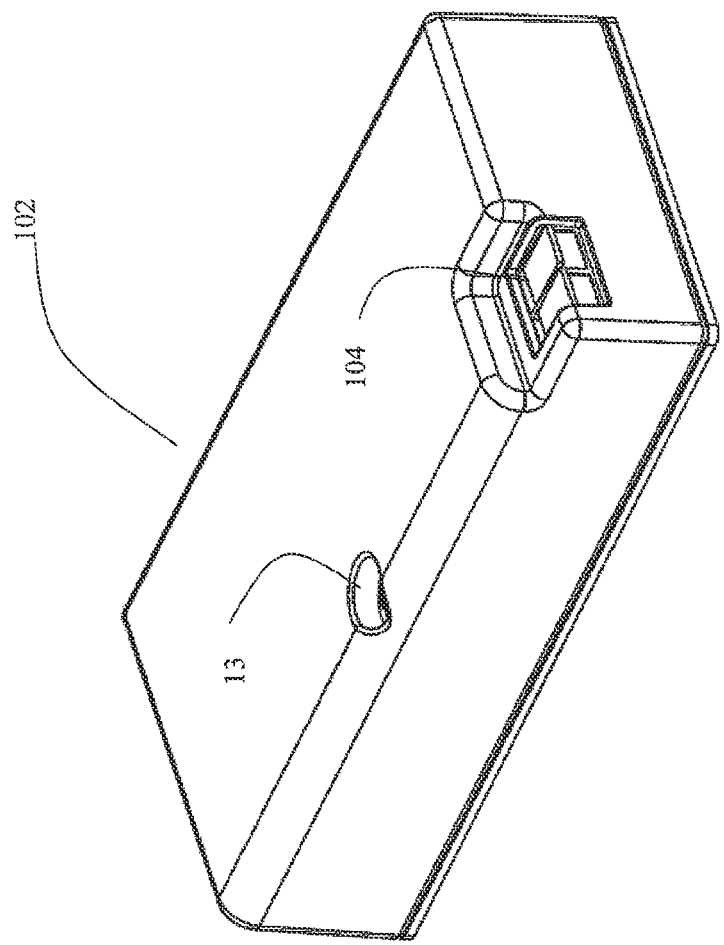
FIG. 28 is an isometric view of an embodiment of a wireless access module.

FIG. 28 is an isometric view of an embodiment of a wireless uNID access module 102. It is similar to uNID access module 2. However, it has only one IDC connectors 104.

Figure 29B:
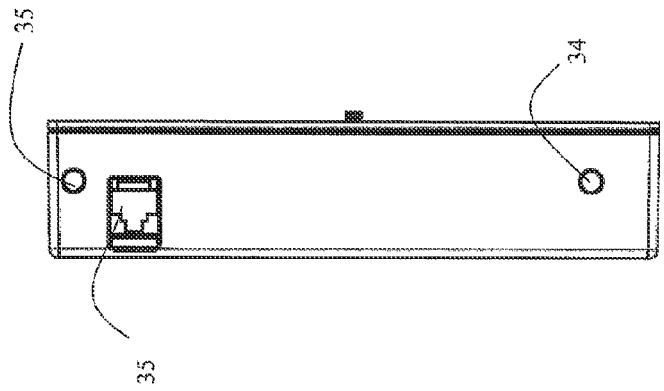
FIGS. 29a, 29b and 29c are top, side, and bottom views of an embodiment of a wireless access module for a wireless uNID base module.
Figure 29A:
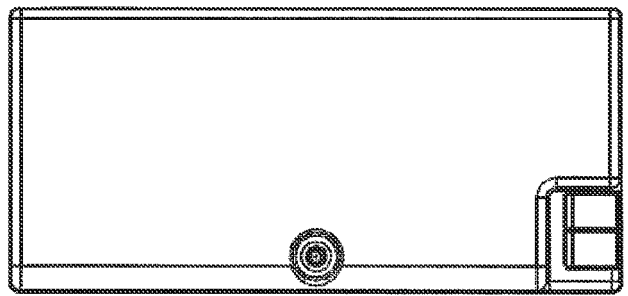
Figure 29C:
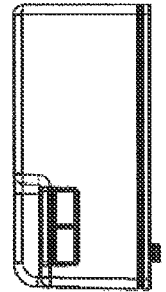

FIGS. 29a, 29b and 29c are top, side, and bottom views of an embodiment of a uNID wireless access module.

Figure 30:
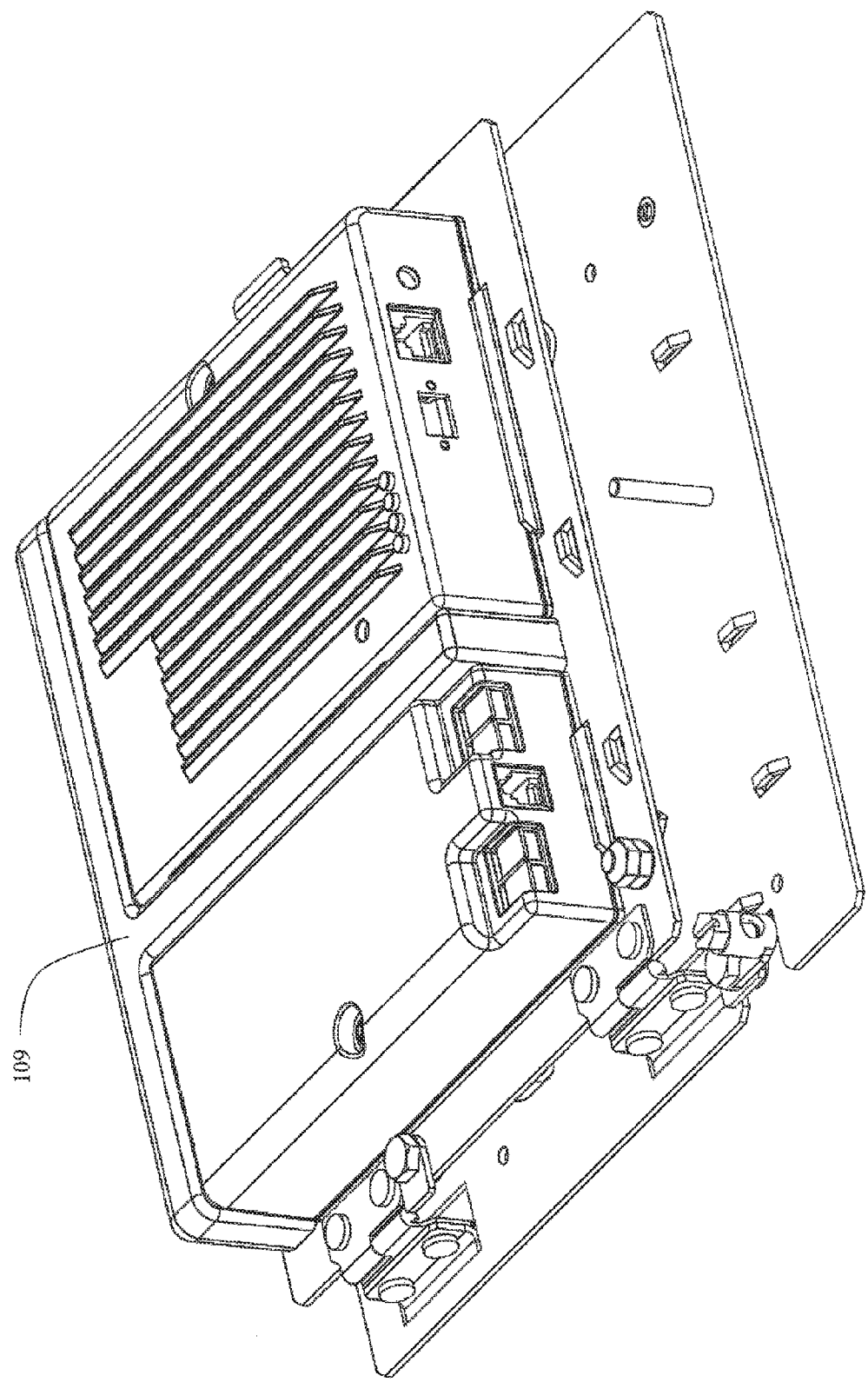
FIG. 30 shows an isometric view of an alternate embodiment of a uNID base module.

FIG. 30 shows an isometric view of an alternate embodiment of a uNID base module. It has a T-shaped dividing structure 109 in place of dividing structure 4.

Figure 31:
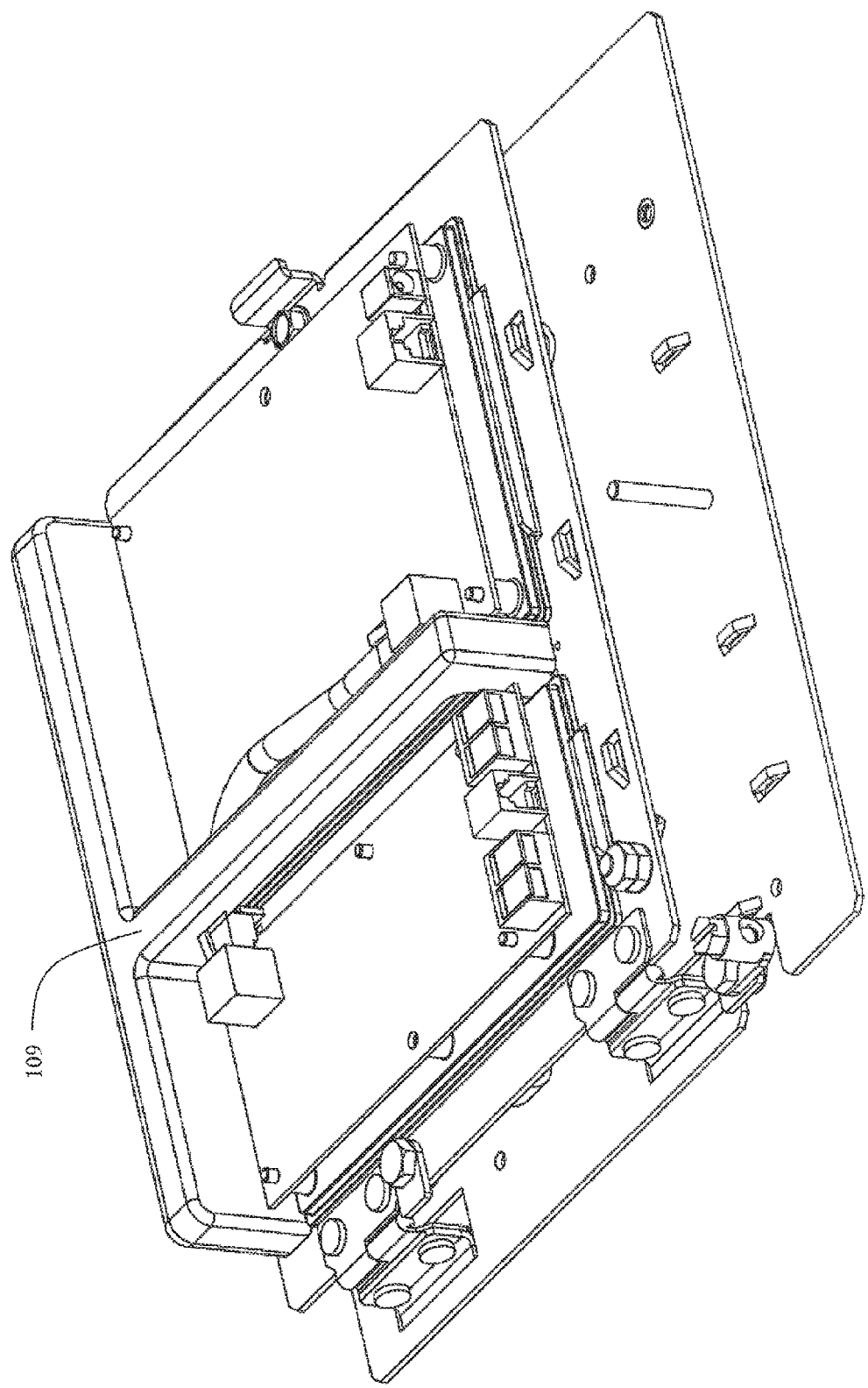
FIG. 31 shows a transparent isometric view of an alternate embodiment of a uNID base module.

FIG. 31 shows a transparent isometric view of an alternate embodiment of a uNID base module.

Advantages and benefits of the invention include the following:

Common base plate, access module, and modem module Form Factor—this minimizes manufacturing design variation and reduces cost.

Modularity.

Modules can be easily replaced/changed out by service provider installation technicians. This provides an easy means for service providers to replace defective modules or replace installed modules with new or upgrade modules.

Centralized home network management point. System provides for installers to provision service from one point.

Technology supports copper and fiber based solutions by using different uNID access modules and a common uNID modem module.

When a uNID base module is installed in a NID, the mechanical design allows for co-installation of other technologies. For example, a satellite TV junction box can be installed in the NID. This option is necessary in rural areas that many have high speed internet service but insufficient bandwidth to provide video service.

Common architecture for network planners.

Modular access modules—one or two line Variants.

Base platform can be used in landline or wireless applications.

Low-cost means to use a landline FTTN network as backbone for wireless service.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A universal network interface device base module comprising:
    an access module;
    a modem module electrically connected to said access module;
    a dividing structure placed between said access module and said modem module; and
    a base plate mounted on an interior surface of the universal network interface device base module;
    wherein said access module, modem module and dividing structure are each mounted on said base plate,
    wherein the modem module is for connection between a premise and a service provider network,
    wherein the dividing structure is a discrete structure having a first surface mounted on said base plate, a second surface and a third surface opposing each other and orthogonal to the first surface, and the second surface facing said modem module and the third surface facing said access module.

2. The universal network interface device base module of claim 1 further comprising a cable connecting said access module to said modem module.

3. The universal network interface device base module of claim 2 wherein said dividing structure has an opening through which said cable passes.

4. The universal network interface device base module of claim 1 wherein:
    said dividing structure has a first detent on said third surface facing said access module and a second detent on said second surface facing said modem module;
    said access module has a first recess on a surface facing said third surface of said dividing structure, such that said first detent fits into said access module first recess when said access module is mounted on said base plate; and
    said modem module has a first recess on a surface facing said second surface of said dividing structure, such that said second detent fits into said modem module first recess when said modem module is mounted on said base plate.

5. The universal network interface device base module of claim 1 wherein said base plate comprises a plurality of flanges that abut surfaces of said access module and modem module.

6. The universal network interface device base module of claim 1 wherein said base plate comprises at least one hinge assembly that can be used to mount the network interface device in an enclosure.

7. The universal network interface device base module of claim 1 wherein said access module is a one-line xDSL module.

8. The universal network interface device base module of claim 1 wherein said access module is a two-line xDSL module.

9. The universal network interface device base module of claim 1 wherein said access module is a GPON module.

10. The universal network interface device base module of claim 1 wherein said modem module is a wireless modem module.

11. The universal network interface device base module of claim 1 wherein said dividing structure has a T-shape.

12. The universal network interface device base module of claim 1 wherein the dividing structure is rectangular.

13. The universal network interface device base module of claim 1 wherein an access module circuit and a modem module circuit are grounded to the base plate.

14. The universal network interface device base module of claim 1, wherein the dividing structure is a rectangular cuboid.

15. A network interface device enclosure comprising:
    an enclosure;
    a universal network interface device base module comprising:
    an access module;
    a modem module electrically connected to said access module;
    a dividing structure placed between said access module and said modem module; and
    a base plate mounted on an interior surface of the network interface device enclosure;
    wherein said access module, modem module and dividing structure are each mounted on said base plate,
    wherein the modem module is for connection between a premise and a service provider network,
    wherein the dividing structure is a discrete structure having a first surface mounted on said base plate, a second surface and a third surface opposing each other and orthogonal to the first surface, and the second surface facing said modem module and the third surface facing said access module.

16. The universal network interface device enclosure of claim 15 further comprising a cable connecting said access module to said modem module.

17. The network interface device enclosure of claim 16 wherein said dividing structure has an opening through which said cable passes.

18. The network interface device enclosure of claim 15 wherein:
said dividing structure has a first detent on said third surface facing said access module and a second detent on said second surface facing said modem module;
said access module has a first recess on a surface facing said third surface of said dividing structure, such that said first detent fits into said access module first recess when said access module is mounted on said base plate; and
said modem module has a first recess on a surface facing said second surface of said dividing structure, such that said second detent fits into said modem module first recess when said modem module is mounted on said base plate.

19. The network interface device enclosure of claim 15 wherein said base plate comprises a plurality of flanges that abut surfaces of said access module and modem module.

20. The network interface device enclosure of claim 15 wherein said base plate comprises at least one hinge assembly that is used to mount the network interface device module to said enclosure.

21. The network interface device enclosure of claim 15 wherein said access module is a one-line xDSL module.

22. The network interface device enclosure of claim 15 wherein said access module is a two-line xDSL module.

23. The network interface device enclosure of claim 15 wherein said access module is a GPON module.

24. The network interface device enclosure of claim 15 wherein said modem module is a wireless modem module one-line xDSL module.

25. The network interface device enclosure of claim 15 wherein said dividing structure has a T-shape.

26. The network interface device enclosure of claim 15 wherein a storage compartment is formed between a surface of said base plate and a surface of said enclosure.

* * * * *